United States Patent
Zhuang et al.

(10) Patent No.: US 11,948,323 B2
(45) Date of Patent: Apr. 2, 2024

(54) MEASUREMENT METHOD AND MEASUREMENT APPARATUS

(71) Applicant: CONTEMPORARY AMPEREX TECHNOLOGY CO., LIMITED, Ningde (CN)

(72) Inventors: Weilin Zhuang, Ningde (CN); Guannan Jiang, Ningde (CN); Annan Shu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/131,282

(22) Filed: Apr. 5, 2023

(65) Prior Publication Data

US 2024/0037770 A1 Feb. 1, 2024

Related U.S. Application Data

(63) Continuation of application No. PCT/CN2022/108941, filed on Jul. 29, 2022.

(51) Int. Cl.
*G06K 9/36* (2006.01)
*G06T 7/194* (2017.01)
(Continued)

(52) U.S. Cl.
CPC .............. *G06T 7/62* (2017.01); *G06T 7/194* (2017.01); *G06T 9/00* (2013.01)

(58) Field of Classification Search
CPC ............ G01N 21/01; H01M 10/0525; H01M 10/058; H01M 10/0585; H01M 50/531; Y02E 60/00; Y02E 60/10; Y02P 70/50; G06T 5/002; G06T 7/0006; G06T 7/12; G06T 2207/10004; G06T 2207/30164; G06T 7/62; G06T 7/194; G06T 9/00; B23Q 17/249; B23Q 17/2428; B23Q 17/2452; B23Q 17/2471; G05B 2219/37555;
(Continued)

(56) References Cited

U.S. PATENT DOCUMENTS

2020/0134773 A1* 4/2020 Pinter ................ G01N 21/8806

FOREIGN PATENT DOCUMENTS

CN 103196383 A 7/2013
CN 108180851 A 6/2018
(Continued)

OTHER PUBLICATIONS

English translation of CN114740001A (Year: 2022).*
(Continued)

*Primary Examiner* — Duy M Dang
(74) *Attorney, Agent, or Firm* — XSENSUS LLP

(57) ABSTRACT

Embodiments of this application provide a measurement method and a measurement apparatus. The measurement method includes: acquiring a first image and a second image of a target object, where the first image is acquired by a camera located on a non-backlight side of the target object, and the second image is acquired by a camera located on a backlight side of target object; and measuring the target object for size information according to the first image and the second image. The technical solution of this application can improve accuracy and precision of inspection while improving production efficiency.

26 Claims, 13 Drawing Sheets

(51) Int. Cl.
*G06T 7/62* (2017.01)
*G06T 9/00* (2006.01)

(58) Field of Classification Search
CPC ........... G05B 2219/37575; G05B 2219/37576; G05B 2219/37577; G05B 2219/37578; G05B 2219/37581
USPC .................. 382/141, 145, 147, 149, 152
See application file for complete search history.

(56) References Cited

FOREIGN PATENT DOCUMENTS

| | | |
|---|---|---|
| CN | 109741323 A | 5/2019 |
| CN | 111311482 A | 6/2020 |
| CN | 111781203 A | 10/2020 |
| CN | 112529931 A | 3/2021 |
| CN | 113376177 A | 9/2021 |
| CN | 114018160 A | 2/2022 |
| CN | 216251029 U | 4/2022 |
| CN | 114740001 A | 7/2022 |
| JP | 2010218752 A | 9/2010 |
| JP | 2017090360 A | 5/2017 |

OTHER PUBLICATIONS

International Search Report dated Apr. 26, 2023 in corresponding International Patent Application No. PCT/CN2022/108941 (with English translation), 8 pages.
Written Opinion of the International Searching Authority dated Apr. 26, 2023 in corresponding International Patent Application No. PCT/CN2022/108941 (with English translation), 10 pages.
Extended European Search Report dated Jan. 3, 2024 in European Patent Application No. 22871097.6, 7 pages.

* cited by examiner

MEASUREMENT METHOD AND MEASUREMENT APPARATUS

CROSS-REFERENCE TO RELATED APPLICATION

This application is a continuation of PCT Patent Application No. PCT/CN2022/108941, entitled "MEASUREMENT METHOD AND MEASUREMENT APPARATUS" filed on Jul. 29, 2022, which is incorporated herein by reference in its entirety.

TECHNICAL FIELD

This application relates to the field of inspection technologies, and in particular, to a measurement method and a measurement apparatus.

BACKGROUND

In production, products on a production line are inspected by a separate apparatus in most cases. This inspection method is difficult to meet the demand for real-time inspection of products and is not conducive to improving production efficiency. However, with existing real-time product inspection solutions, only a rough outline and size of a product can be measured, and it is difficult to inspect finer size information about the product.

Therefore, how to provide a measurement method to improve accuracy and precision of inspection while improving production efficiency is a technical problem to be solved urgently.

SUMMARY

This application provides a measurement method and a measurement apparatus, which can improve accuracy and precision of inspection while improving production efficiency.

According to a first aspect, this application provides a measurement method including: acquiring a first image and a second image of a target object, where the first image is acquired by a camera located on a non-backlight side of the target object, and the second image is acquired by a camera located on a backlight side of the target object; and measuring the target object for size information according to the first image and the second image.

An embodiment of this application provides a measurement method, where the measurement method includes: acquiring a first image and a second image of a target object, where the first image is acquired by a camera located on a non-backlight side of the target object, and the second image is acquired by a camera located on a backlight side of target object; and measuring the target object for size information according to the first image and the second image. The acquisition of the first image and the second image by cameras located at different locations is conducive to inspecting the target object during a production process. Since the first image and the second image are acquired by cameras located at different locations with respect to a light source, the first image and the second image contain more information about the target object than the first image or second image alone, which can overcome limitations of acquiring an image with a single camera. The size information about the target object is measured according to the first image and the second image such that size information about the target object can be calculated more accurately and precisely, which is conducive to improving accuracy and precision of inspection. Therefore, the technical solution of this application can improve the accuracy and precision of inspection while improving the production efficiency.

In a possible implementation, the target object is an electrode plate, where the electrode plate includes an electrode plate body and a tab, the tab includes a body portion and a connecting portion, the electrode plate body extends along a first direction, the tab protrudes from the electrode plate body along a second direction, the body portion of the tab is connected to the electrode plate body via the connecting portion, the electrode plate body and the connecting portion are coated with an active substance, and the body portion is not coated with the active substance, the first direction is a conveying direction of the electrode plate, and the second direction is perpendicular to the first direction. In this way, the size information about the electrode plate can be obtained by measurement using the first image and the second image, which is conducive to improving accuracy in measuring the size of the electrode plate and providing richer size information about the tab can be obtained by measurement.

In a possible implementation, the measuring the target object for size information according to the first image and the second image includes: obtaining a first target image according to the first image, the first target image including one such tab in the first direction; obtaining a second target image according to the second image, the second target image including one such tab in the first direction; and measuring the tab for size information according to the first target image and the second target image. In this way, the size information about each tab can be measured using the first target image and the second target image.

In a possible implementation, the measuring the tab for size information according to the first target image and the second target image includes: measuring the body portion of the tab for size information according to the first target image; and measuring the tab for size information according to the second target image.

In this implementation, the first target image corresponds to the non-backlight image, and the size information about the body portion can be measured using the first target image; and the second target image corresponds to the backlight image, and the size information about the tab can be measured using the second target image. The size information about the body portion of the tab, the connecting portion of the tab, and the tab can be measured using the first target image and the second target image.

In a possible implementation, the measuring the body portion of the tab for size information according to the first target image includes: performing foreground segmentation on the first target image according to a first threshold to obtain a first foreground segmentation image; and measuring the body portion for size information according to the first foreground segmentation image.

In this implementation, the first target image corresponds to the non-backlight image. Since the connecting portion of the tab is coated with the active substance and the body portion of the tab is not coated with the active substance, the body portion that is not coated with the active substance can be extracted as a foreground area according to the first threshold, thereby obtaining the first foreground segmentation image and helping to measure the body portion for size information according to the first foreground segmentation image.

In a possible implementation, the measuring the body portion for size information according to the first foreground segmentation image includes: determining a size of the body portion of the tab in the second direction according to pixel values of each column of pixel points in the second direction in the first foreground segmentation image; and determining a size of the body portion of the tab in the first direction according to pixel values of each row of pixel points in the first direction in the first foreground segmentation image. This helps to quickly and accurately determine the sizes of the body portion of the tab in the first direction and the second direction.

In a possible implementation, the measuring the tab for size information according to the second target image includes: performing foreground segmentation on the second target image according to a second threshold and size information about the electrode plate body to obtain a second foreground segmentation image; and measuring the tab for size information according to the second foreground segmentation image.

In this implementation, the second target image corresponds to the backlight image. According to the second threshold and the size information about the electrode plate body, the tab can be extracted as a foreground area from the second target image to obtain the second foreground segmentation image, helping to measure the tab for size information according to the second foreground segmentation image.

In a possible implementation, the measuring the tab for size information according to the second foreground segmentation image includes: determining a size of the tab in the second direction according to pixel values of each column of pixel points in the second direction in the second foreground segmentation image; and determining a size and coordinate of the tab in the first direction according to pixel values of each row of pixel points in the first direction in the second foreground segmentation image. This helps to quickly and accurately determine the sizes of the tab in the first direction and the second direction and the coordinate of the tab in the first direction.

In a possible implementation, the determining a size and coordinate of the tab in the first direction according to pixel values of each row of pixel points in the first direction in the second foreground segmentation image includes: determining a size of a first end of the tab according to a number of non-zero elements in a first column vector, where the first end of the tab is an end of the tab closer to the electrode plate body in the second direction, and the first column vector is composed of averages or sums of pixel values of respective rows of pixel points in the first direction in the second foreground segmentation image; and measuring a coordinate of a central position of the tab in the first direction according to coordinates of the non-zero elements in the first column vector. In this way, the size of the first end of the tab and the coordinate of a central position of the tab in the first direction can be accurately and quickly determined.

In a possible implementation, the determining a size and coordinate of the tab in the first direction according to pixel values of each row of foreground pixel points in the first direction in the second foreground segmentation image includes: measuring a size of a second end of the tab according to pixel values of pixel points along the first direction at a first preset position in the second foreground segmentation image, where the second end of the tab is an end of the tab farther away from the electrode plate body in the second direction. This helps to quickly determine the size of the second end of the tab.

In a possible implementation, the measuring the tab for size information according to the first target image and the second target image includes: determining a size of the connecting portion of the tab in the second direction according to the size of the body portion of the tab in the second direction and the size of the tab in the second direction. In this way, the size of the connecting portion of the tab can be quickly and accurately determined.

In a possible implementation, the method further includes: determining a number of the tabs in the first direction in the second image; where the obtaining a first target image according to the first image includes: obtaining the first target image corresponding to each tab in the first direction, according to the number of the tabs in the first direction and the first image; and the obtaining a second target image according to the second image includes: obtaining the second target image corresponding to each tab in the first direction, according to the number of the tabs in the first direction and the second image.

In this implementation, the first target image and the second target image need to be determined according to the number of tabs in the first direction in the second image. This can ensure that only one tab exists in the first direction in the first target image and the second target image, facilitating the measurement of the size of the tab.

In a possible implementation, the determining a number of the tabs in the first direction in the second image includes: performing foreground segmentation on the second image according to a second threshold and size information about the electrode plate body to obtain a third foreground segmentation image; and determining the number of the tabs in the first direction according to the third foreground segmentation image.

In this implementation, according to the second threshold and the size information about the electrode plate body, the tab in the second image can be extracted as a foreground area so that the third foreground segmentation image is obtained, helping to determine the number of the tabs in the first direction according to the third foreground segmentation image.

In a possible implementation, the determining the number of the tabs in the first direction according to the third foreground segmentation image includes: under the condition that a difference between ordinates of adjacent non-zero elements in a second column vector is greater than a first specified value, determining that the number of the tabs is 2, where the second column vector is composed of averages or sums of pixel values of respective rows of pixel points in the first direction in the third foreground segmentation image; or, under the condition that a difference between ordinates of adjacent non-zero elements in the second column vector is less than or equal to the first specified value, determining that the number of the tabs is 1. This helps to quickly and accurately determine the number of the tabs in the first direction.

In a possible implementation, before the measuring the tab for size information according to the first target image and the second target image, the method further includes: measuring the electrode plate body for size information according to the first image; and/or measuring the electrode plate body for size information according to the second image. In this way, the measured size information about the electrode plate body helps to measure the tab for size information according to the size information about the electrode plate body, and also helps to inspect, according to the size information about the electrode plate body, whether the electrode plate has a defect.

In a possible implementation, the measuring the electrode plate body for size information according to the second image includes: performing foreground segmentation on the second image according to a second threshold to obtain a fourth foreground segmentation image; and measuring the electrode plate body for size information according to pixel values of each column of pixel points in the second direction in the fourth foreground segmentation image.

In this implementation, according to the second threshold, the electrode plate in the second image can be extracted as a foreground area so that the fourth foreground segmentation image is obtained, helping to measure the electrode plate body for size information according to the fourth foreground segmentation image.

In a possible implementation, the measuring the electrode plate body for size information according to pixel values of each column of pixel points in the second direction in the fourth foreground segmentation image includes: obtaining a first row vector, where the first row vector is composed of sums or averages of pixel values of respective columns of pixel points in the second direction in the fourth foreground segmentation image; setting elements with a value less than a second specified value in the first row vector to 0; and determining size information about the electrode plate body according to non-zero elements in the first row vector. This can prevent a mark hole on the electrode plate and the like from affecting the size information about the electrode plate body.

In a possible implementation, the method further includes: measuring a mark hole on the electrode plate for size information. This helps to determine a start position and an end position for tab counting according to the mark hole.

In a possible implementation, the measuring a mark hole on the electrode plate for size information includes: performing foreground segmentation on the second image according to the second threshold and the fourth foreground segmentation image to obtain a fifth foreground segmentation image; and determining a size and coordinate of the mark hole in the first direction and a size and coordinate of the mark hole in the second direction according to pixel values of each column of pixel points in the second direction and pixel values of each row of pixel points in the first direction in the fifth foreground segmentation image. This helps to quickly and accurately measure the size and coordinate of the mark hole.

In a possible implementation, the measuring the electrode plate body for size information according to the first image includes: performing foreground segmentation on the first image according to a third threshold to obtain a sixth foreground segmentation image; and measuring the electrode plate body for size information according to pixel values of each column of pixel points in the second direction in the sixth foreground segmentation image.

In this implementation, according to the third threshold, the electrode plate in the first image can be extracted as a foreground so that the sixth foreground segmentation image is obtained, helping to measure the electrode plate body for size information according to the sixth foreground segmentation image.

In a possible implementation, the measuring the electrode plate body for size information according to pixel values of each column of pixel points in the second direction in the sixth foreground segmentation image includes: obtaining a second row vector, where the second row vector is composed of sums or averages of pixel values of respective columns of pixel points in the second direction in the sixth foreground segmentation image; setting elements with a value less than a second specified value in the second row vector to 0; and determining size information about the electrode plate body according to non-zero elements in the second row vector. This helps to quickly and accurately determine the size information about the electrode plate body, and whether the electrode plate has a defect such as excessive or insufficient die-cutting can be also detected according to the size information about the electrode plate body.

In a possible implementation, the method further includes: performing foreground segmentation on the first image according to a first threshold to obtain a seventh foreground segmentation image; determining a number of non-zero elements in a third column vector according to the seventh foreground segmentation image, where the third column vector is composed of averages or sums of pixel values of respective rows of pixel points in the first direction in the seventh foreground segmentation image; and determining whether the electrode plate has a residual material defect, according to the number of non-zero elements in the third column vector. This helps to determine a size of the foreground area in the seventh foreground segmentation image according to the seventh foreground segmentation image, thereby determining whether a residual material defect exists, according to the size of the foreground area.

In a possible implementation, the determining whether the electrode plate has a residual material defect, according to the number of non-zero elements in the third column vector includes: under the condition that the number of non-zero elements in the third column vector is greater than the third specified value, determining that the electrode plate has a residual material defect. This helps to quickly and accurately determine whether the electrode plate has a residual material defect.

In a possible implementation, the method further includes: determining a number of tabs in the first direction according to the coordinate of the mark hole on the electrode plate and the coordinate of the tab. This helps to determine the number of tabs in the first direction and inspect whether the electrode plate meets a requirement according to the number of tabs in the first direction.

In a possible implementation, before the measuring the target object for size information according to the first image and the second image, the method further includes: performing grayscale homogenization processing on the first image. In this way, grayscale values of different first images can be put in a unified grayscale space, which is convenient for threshold setting and foreground segmentation.

In a possible implementation, before the acquiring a first image and a second image of a target object, the method further includes: acquiring a backlight image and a non-backlight image; and compressing the backlight image and the non-backlight image according to a first ratio to obtain the first image and the second image. In this way, measurement methods can be run faster while preserving image information.

In a possible implementation, the method further includes: restoring actual size information about the target object from the measured size information about the target object according to the first ratio. In this way, the actual size information can be restored from the measured size information about the target object according to the first ratio.

According to a second aspect, an embodiment of this application provides a measurement apparatus including a processing module, where the processing module is configured to: acquire a first image and a second image of a target object, where the first image is acquired by a camera located on a non-backlight side of the target object, and the second image is acquired by a camera located on a backlight side of the target object; and measure the target object for size information according to the first image and the second image.

According to a third aspect, an embodiment of this application provides a measurement apparatus including: a memory, configured to store computer-executable instructions; and a processor, configured to access the memory and execute the computer-executable instructions, to perform the operations in the method according to any of the first aspect.

According to the fourth aspect, this application provides a storage medium configured to store a computer program, and when the computer program is executed by a computing device, the computing device is enabled to implement the method according to any of the first aspect.

An embodiment of this application provides a measurement method, where the measurement method includes: acquiring a first image and a second image of a target object, where the first image is acquired by a camera located on a non-backlight side of the target object, and the second image is acquired by a camera located on a backlight side of target object; and measuring the target object for size information according to the first image and the second image. The acquisition of the first image and the second image by cameras located at different locations is conducive to inspecting the target object during a production process. Since the first image and the second image are acquired by cameras located at different locations with respect to a light source, the first image and the second image contain more information about the target object than the first image or second image alone, which can overcome limitations of acquiring an image with a single camera. The size information about the target object is measured according to the first image and the second image such that size information about the target object can be calculated more accurately and precisely, which is conducive to improving accuracy and precision of inspection. Therefore, the technical solution of this application can improve the accuracy and precision of inspection while improving the production efficiency.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
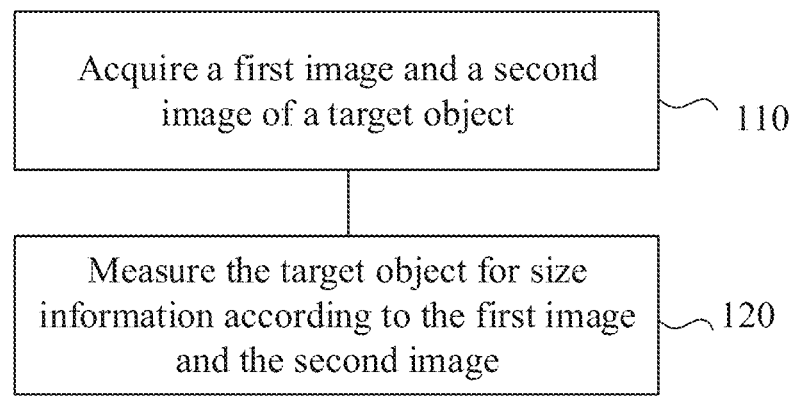
FIG. 1 is a schematic diagram of a measurement method according to an embodiment of this application.

In the accompanying drawings, the figures are not drawn to scale.

DETAILED DESCRIPTION

The following further describes implementations of this application in detail with reference to accompanying drawings and embodiments. The detailed description of the following embodiments and the accompanying drawings are used to exemplarily illustrate the principle of this application, but cannot be used to limit the scope of this application, that is, this application is not limited to the described embodiments.

The term "and/or" in this specification is only an associative relationship for describing associated objects, indicating that three relationships may be present. For example, A and/or B may indicate three cases: presence of only A; presence of both A and B; and presence of only B. In addition, the character "/" in this specification generally indicates an "or" relationship between contextually associated objects.

In production, products on a production line are inspected by a separate apparatus in most cases. This inspection method is difficult to meet the demand for real-time inspection of products and is not conducive to improving production efficiency. Based on this, there have been some solutions for inspecting products in real time. In these inspection solutions, images are acquired by a single camera, and a target object is inspected based on the acquired images. However, in most cases, nothing but outline information about a product can be obtained according to images obtained by a single camera, and therefore only rough sizes of the target objects can be measured rather than accurate size information. Therefore, how to provide a measurement method to improve accuracy and precision of inspection while improving production efficiency is a technical problem to be solved urgently.

Accordingly, an embodiment of this application provides a measurement method. The measurement method includes: acquiring a first image and a second image of a target object, where the first image is acquired by a camera located on a non-backlight side of the target object, and the second image is acquired by a camera located on a backlight side of target object; and measuring the target object for size information according to the first image and the second image. The acquisition of the first image and the second image by cameras located at different locations is conducive to inspecting the target object during a production process. Since the first image and the second image are acquired by cameras located at different locations with respect to a light source, the first image and the second image contain more information about the target object than the first image or second image alone, which can overcome limitations of acquiring an image with a single camera. The size information about the target object is measured according to the first image and the second image such that size information about the target object can be calculated more accurately and precisely, which is conducive to improving accuracy and precision of inspection. Therefore, the technical solution of this application can improve the accuracy and precision of inspection while improving the production efficiency.

The measurement method in this application can be applied in the field of industrial inspection technologies, for example, in real-time production scenarios. For example, the measurement method in this application can be used for inspection of an electrode plate and a tab of the electrode plate, and whether the electrode plate and the tab meet a production requirement may be determined according to size information measured using the measurement method in this application. For another example, the measurement method in this application can be applied to a die-cutting process, and whether there is a problem in the die-cutting process may be determined according to measured size information. For another example, the measurement method in this application can be applied to a coating process, and whether coating misapplying or coating missing occurs may be determined according to measured size information.

FIG. 1 is a schematic diagram of a measurement method according to an embodiment of this application. In this embodiment of this application, as shown in FIG. 1, a measurement method 100 includes step 110 and step 120.

Step 110. Acquire a first image and a second image of a target object, where the first image is acquired by a camera located on a non-backlight side of the target object, and the second image is acquired by a camera located on a backlight side of the target object.

The first image and the second image are different images. The first image is acquired by a camera located on a non-backlight side of the target object, and the second image is acquired by a camera located on a backlight side of the target object. That is, the first image is a non-backlight image, and the second image is a backlight image.

Pixel values of pixel points in the second image are concentrated around 0 and 255. For example, the target object appears black in the second image, and pixel values are concentrated around 0. Areas other than the target object appear white, and pixel values are concentrated around 255.

The first image is a non-backlight image and has richer pixel values of the pixel points.

The camera can be arranged to face the target object. For example, when the target object is conveyed along a horizontal direction, the camera is arranged over or under the target object.

Optionally, the camera is a line scan camera.

The first image and the second image are images of a same area of the target object. For example, in an actual measurement process, the target object is in a state of being conveyed, and in order to ensure that the first image and the second image correspond to a same area of the target object, the camera can be arranged according to a speed of image acquisition and a distance for image acquisition.

The camera is not specifically limited to any specific type in this application, as long as a function of photographing the target object can be implemented.

The first image and the second image contain different information about the target object. An outer outline of the target object in the second image is clearer, and specific arrangement and structure of the target object in the first image are clearer. The first image and the second image contain more information about the target object than the first image or second image alone, which can overcome limitations of acquiring an image with a single camera.

Step 120. Measure the target object for size information according to the first image and the second image.

The size information about the target object includes information related to a size of the target object, for example, the size of the target object and a coordinate of the target object.

The target object can be more accurately and precisely measured according to the first image and the second image, that is, in combination of information contained in the first image and the second image, which is conducive to improving accuracy and precision of inspection. After the size information about the target object is obtained by measurement, the size information can be used to determine whether the target object has a defect and whether the target object meets the requirement.

The measurement method in this application can be performed by a control unit. The control unit may be a control unit of a computer, and the computer may be used to monitor the production process in real time and measure the target object in the first image and the second image for relevant size information. The control unit may also be connected to the camera to obtain images captured by the camera and process the images.

An embodiment of this application provides a measurement method, where the measurement method includes: acquiring a first image and a second image of a target object, where the first image is acquired by a camera located on a non-backlight side of the target object, and the second image is acquired by a camera located on a backlight side of target object; and measuring the target object for size information according to the first image and the second image. The acquisition of the first image and the second image by cameras located at different locations is conducive to inspecting the target object during a production process. Since the first image and the second image are acquired by cameras located at different locations with respect to a light source, the first image and the second image contain more information about the target object than the first image or second image alone, which can overcome limitations of acquiring an image with a single camera. The size information about the target object is measured according to the first image and the second image such that size information about the target object can be calculated more accurately and precisely, which is conducive to improving accuracy and precision of inspection. Therefore, the technical solution of this application can improve the accuracy and precision of inspection while improving the production efficiency.

Figure 2:
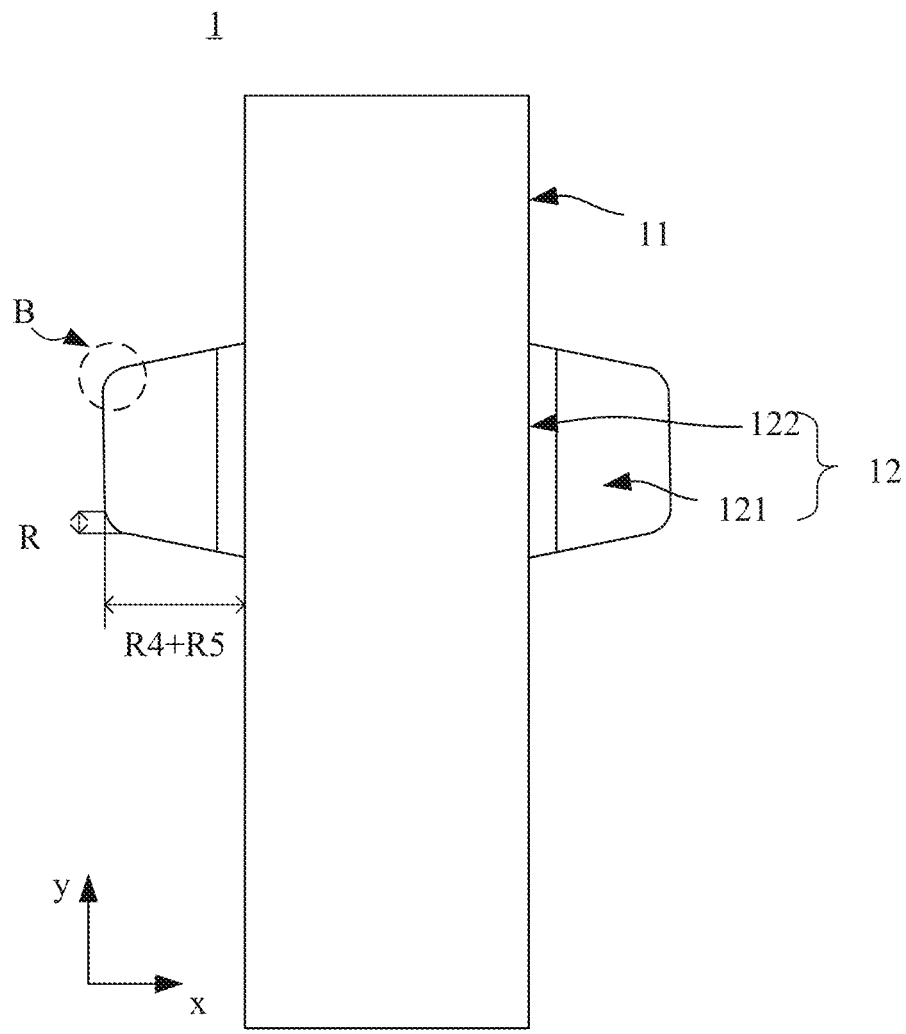
FIG. 2 is a schematic diagram of an electrode plate according to an embodiment of this application.

FIG. 2 is a schematic diagram of an electrode plate according to an embodiment of this application. In an embodiment, as shown in FIG. 2, a target object is an electrode plate 1. The electrode plate 1 includes an electrode plate body 11 and a tab 12. The tab 12 includes a body portion 121 and a connecting portion 122. The electrode plate body 11 extends along a first direction. The tab 12 protrudes from the electrode plate body 11 along a second direction. The body portion 121 of the tab 12 is connected to the electrode plate body 11 via the connecting portion 122. The electrode plate body 11 and the connecting portion 122 are coated with an active substance, and the body portion 121 is not coated with the active substance. The first direction is a conveying direction of the electrode plate 1, and the second direction is perpendicular to the first direction.

The first direction may be the y direction in FIG. 2, that is, an ordinate direction; and the second direction may be the x direction in FIG. 2, that is, an abscissa direction.

Figure 3:
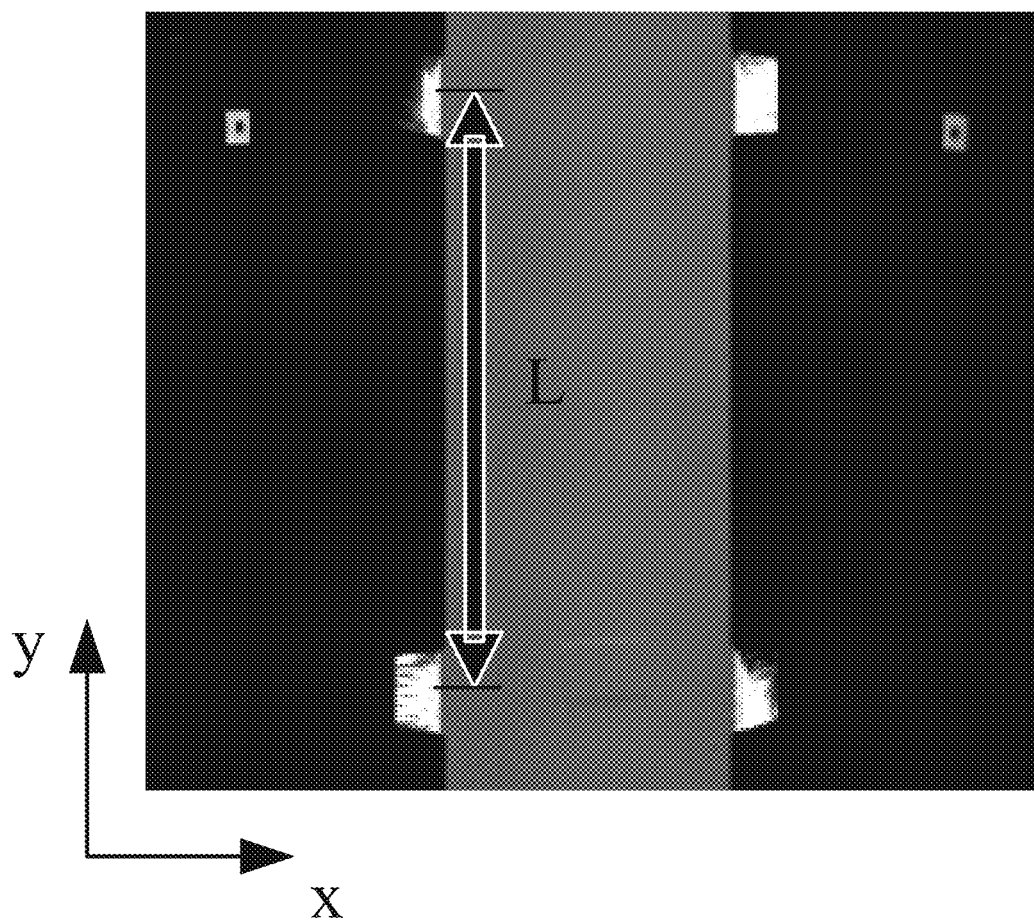
FIG. 3 is a schematic diagram of a first image according to an embodiment of this application.

FIG. 3 is a schematic diagram of a first image according to an embodiment of this application. As shown in FIG. 3, the first image is a grayscale image of an electrode plate 1. According to pixel values of pixel points in the first image, the first image may be divided into three parts: an electrode plate body part, a tab part, and a background part.

For the first image, when the tab 12 of the electrode plate 1 is folded over, the tab in the first image is not displayed completely. It is difficult to obtain complete size information about the tab according to the first image alone.

Figure 4:
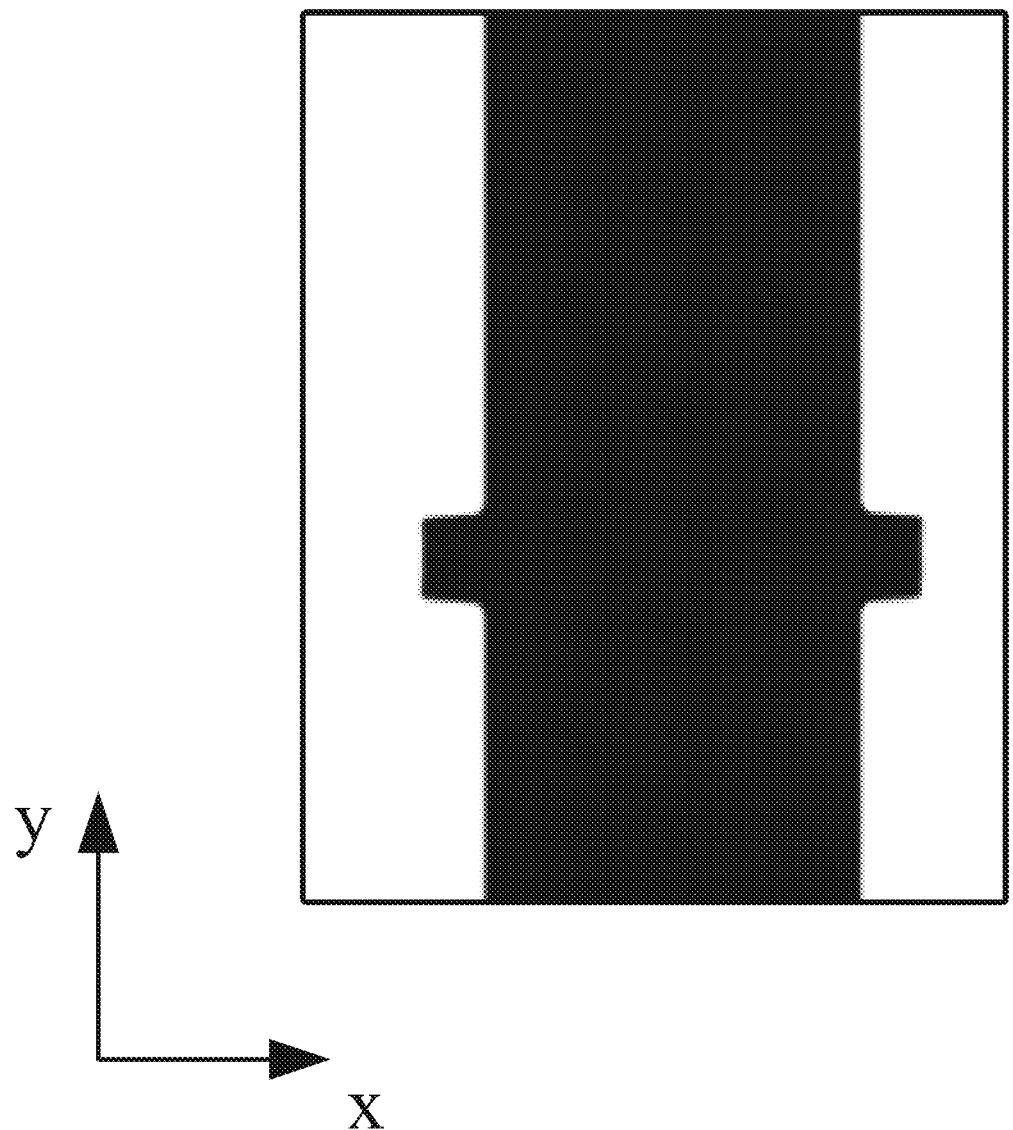
FIG. 4 is a schematic diagram of a second image according to an embodiment of this application.

FIG. 4 is a schematic diagram of a second image according to an embodiment of this application. As shown in FIG. 4, the second image is a grayscale image of an electrode plate 1. The second image is acquired by a camera located on a backlight side of the electrode plate 1. According to pixel values of pixel points in the second image, the second image may be divided into two parts: an electrode plate part and a background part.

For the second image, since the second image is a grayscale image close to a black-and-white image, it is difficult to obtain more detailed size information about the tab by using the second image alone.

In this embodiment, more size information about the electrode plate 1 can be obtained according to the first image and the second image, which is conducive to improving accuracy and precision of measurement on the electrode plate 1.

In an embodiment, step 120 includes: obtaining a first target image according to the first image, the first target image including one such tab 12 in the first direction; obtaining a second target image according to the second image, the second target image including one such tab 12 in the first direction; and measuring the tab 12 for size information according to the first target image and the second target image.

The first target image may be the same as or different from the first image. For example, in the first image, under the condition of only one tab 12 in the first direction, the first target image may be the first image; and in the first image, under the condition of two tabs in the first direction, the first target image is different from the first image. Similarly, the second target image may be the same as or different from the second image.

In this embodiment, the first target image includes one tab 12 in the first direction, and the second target image includes one tab 12 in the first direction. In this way, when measuring the tab 12 for size information according to the first target image and the second target image, only the first target image and the second target image need to be processed to obtain the size information about the tab 12, without determining the number of tabs 12 while measuring the tabs 12 for size information, which reduces the complexity of the measurement method. In addition, size information about each tab 12 can be measured according to the first target image and the second target image, so as to prevent some tabs 12 from being missed when size measurement is being performed on the tabs 12.

In an embodiment, the measuring the tab 12 for size information according to the first target image and the second target image includes: measuring the body portion 121 of the tab 12 for size information according to the first target image; and measuring the tab 12 for size information according to the second target image.

Figure 5:
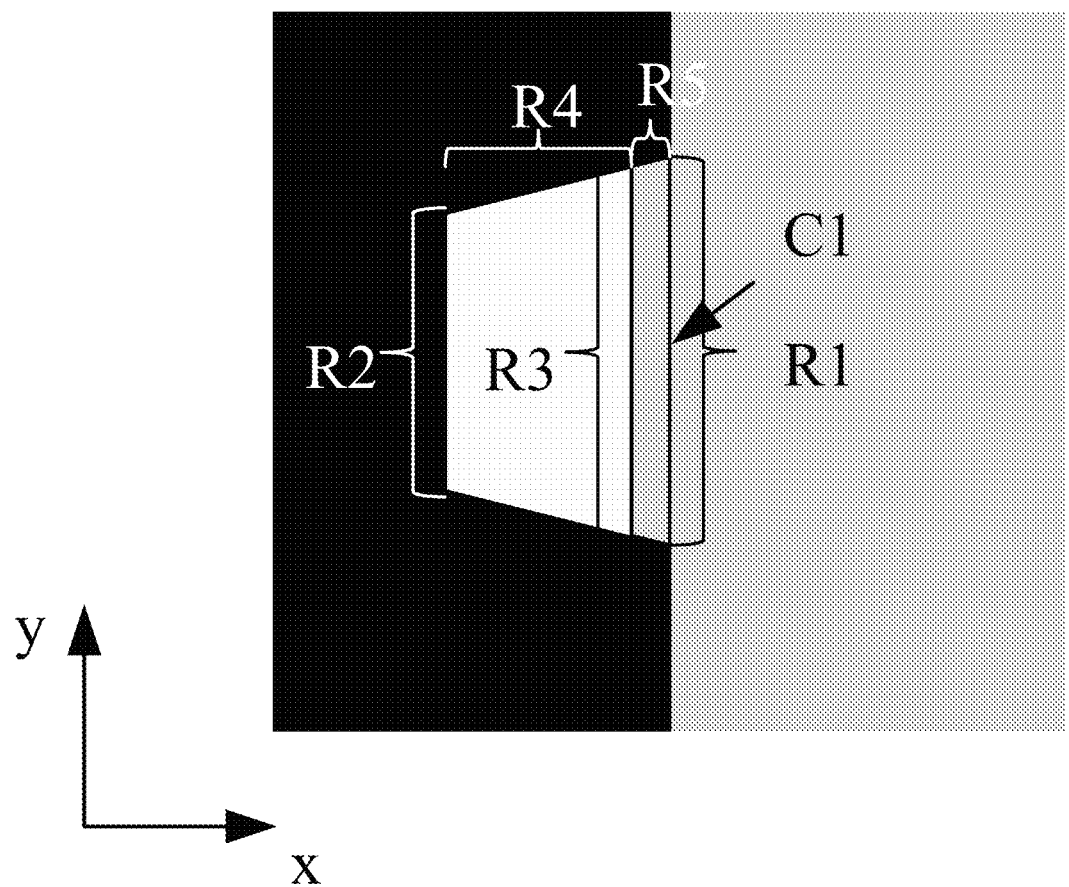
FIG. 5 is a schematic diagram of a tab according to an embodiment of this application.

FIG. 5 is a schematic diagram of a tab according to an embodiment of this application. As shown in FIG. 5, size information about the tab 12 may include information such as sizes and coordinates of the tab 12 in the first direction and the second direction. For example, the size information about the tab 12 includes a size R4 of the body portion 121 in the second direction; a size R3 of the body portion 121 in the first direction, where R3 is the largest size of the body portion 121 in the first direction; a size R5 of the connecting portion 122 in the second direction; a size R1 of a first end of the tab 12 in the first direction, where the first end of the tab 12 is an end of the tab 12 closer to the electrode plate body 11 in the second direction; a coordinate C1 of a central position of the tab 12 in the first direction; a size R2 of a second end of the tab 12 in the first direction, where the second end of the tab 12 is an end of the tab 12 farther away from the electrode plate body 11 in the second direction; and a distance L between adjacent tabs 12 in the first direction.

In this embodiment, the first target image corresponds to the first image. The first target image includes a tab part, an electrode plate body part, and a background part. According to the first target image, size information about the body portion 121 can be obtained by measurement. The second target image corresponds to the second image. The second target image includes an electrode plate part and a background part. According to the second target image, size information about the tab 12 can be obtained by measurement. By analyzing the size information about the body portion 121 and the size information about the tab 12, size information about the connecting portion 122 of the tab 12 can be obtained.

In an embodiment, the measuring the body portion 121 of the tab 12 for size information according to the first target image includes: performing foreground segmentation on the first target image according to a first threshold to obtain a first foreground segmentation image; and measuring the body portion 121 for size information according to the first foreground segmentation image.

Figure 6:
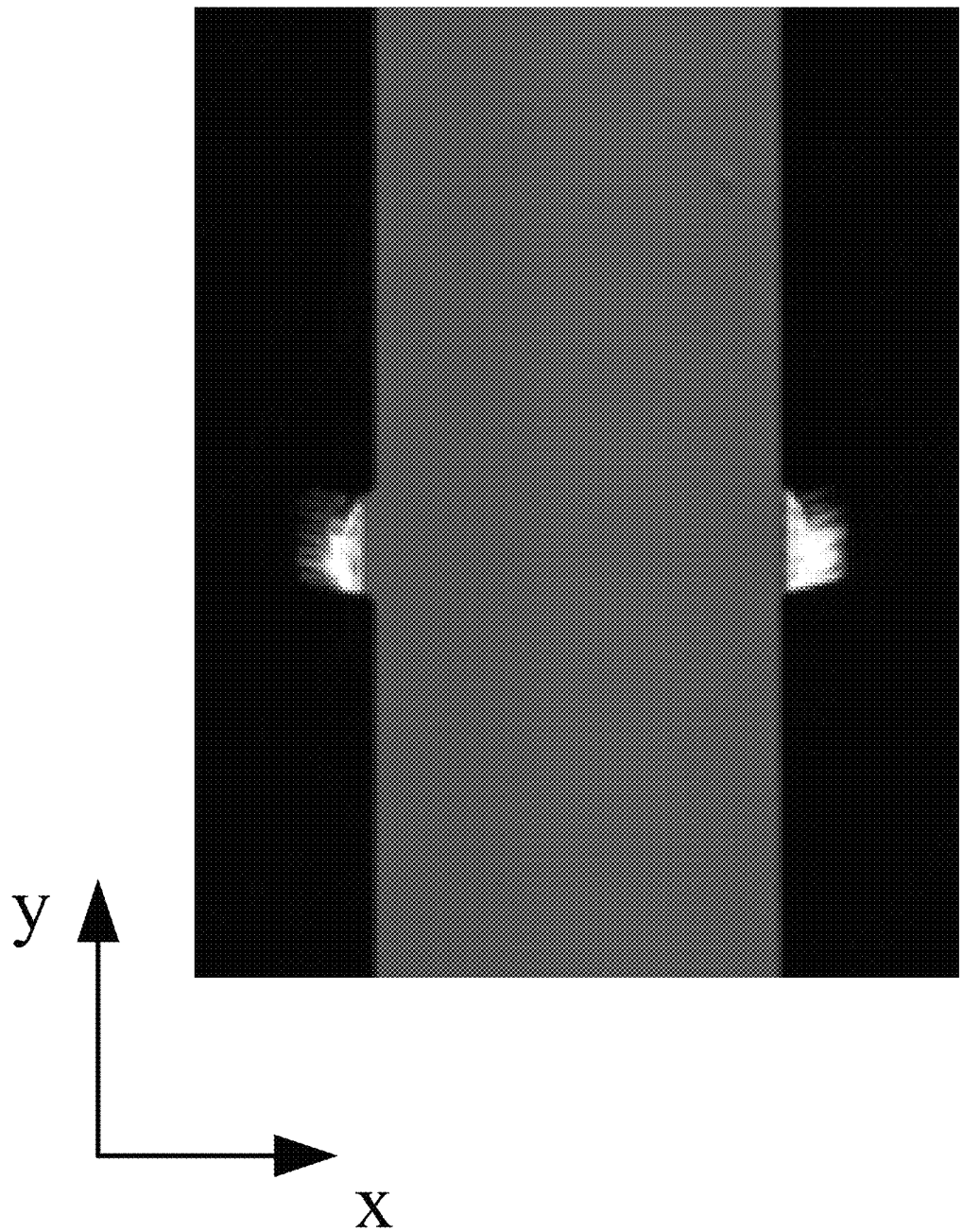
FIG. 6 is a schematic diagram of a first target image according to an embodiment of this application.

FIG. 6 is a schematic diagram of a first target image according to an embodiment of this application. As shown in FIG. 6, grayscale values of the connecting portion 122 and the electrode plate body 11 coated with the active substance are less than a first threshold, and a grayscale value of the body portion 121 not coated with the active substance is greater than or equal to the first threshold. A grayscale value of the background in the first target image is less than the first threshold. Therefore, according to the first threshold, the body portion 121 coated with the active substance can be extracted so that a first foreground segmentation image is obtained.

Optionally, the first threshold may be specifically set as required, for example, set to 10, which is not specifically limited in this embodiment of this application.

To facilitate calculation of the size information about each tab 12, after foreground segmentation is performed on the first target image according to the first threshold, the first target image with foreground extracted may be equally divided along the first direction. Optionally, the first target image may be equally divided along the first direction first, and then foreground segmentation is performed on the divided first target image.

Figure 7:
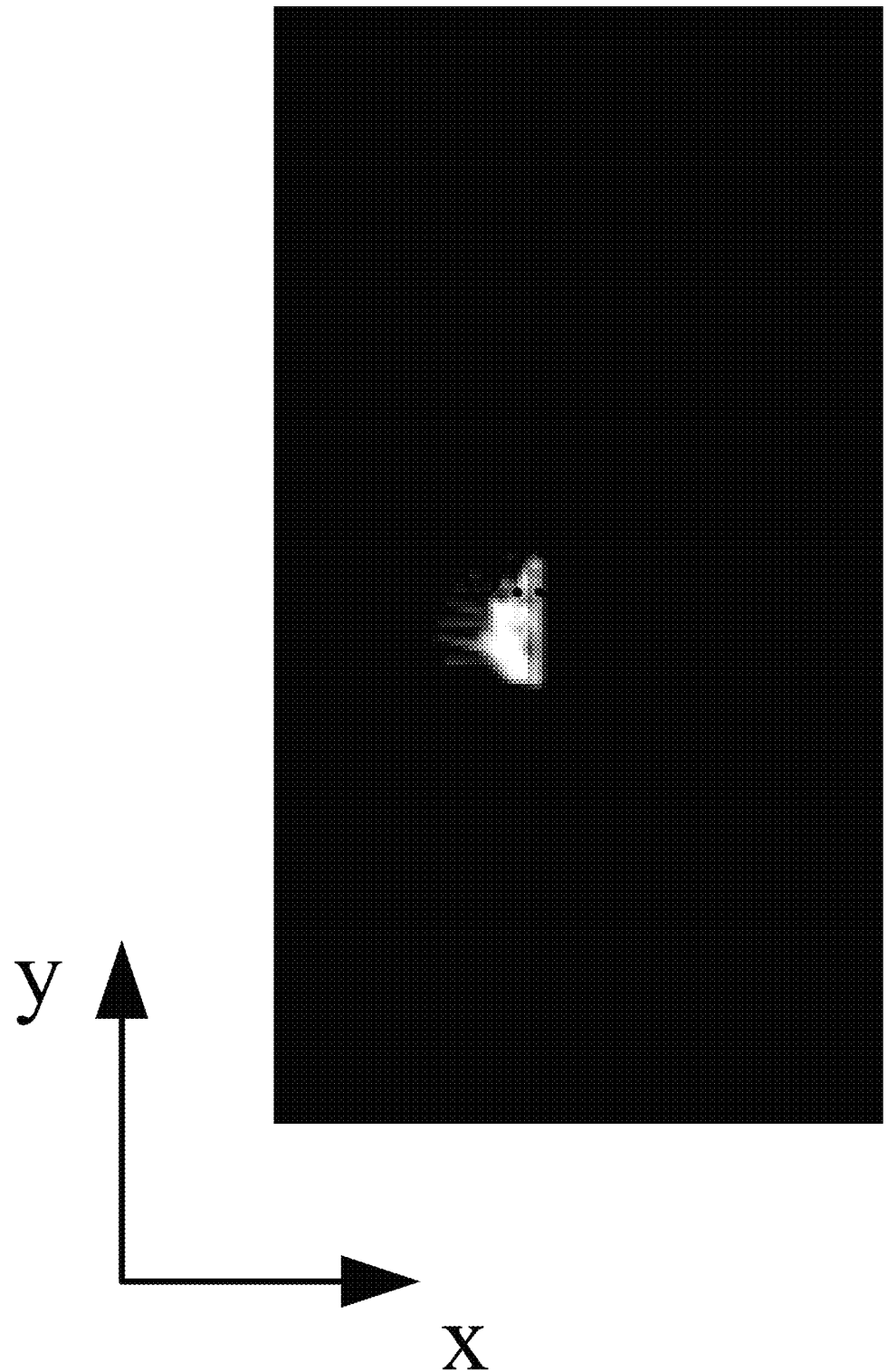
FIG. 7 is a schematic diagram of a first foreground segmentation image according to an embodiment of this application.

FIG. 7 is a schematic diagram of a first foreground segmentation image according to an embodiment of this application. As shown in FIG. 7, in the first foreground segmentation image, the number of tabs 12 in the second direction is 1. In the first foreground segmentation image, the pixel points of the body portion 121 are foreground pixel points, and the rest of the pixel points are background pixel points.

Optionally, pixel values of the foreground pixel points are set to 1, and pixel values of the background pixel points are set to 0.

In this embodiment, by performing foreground segmentation on the first target image, the first foreground segmentation image containing the information about the body portion 121 can be obtained accurately and quickly, helping to measure the body portion 121 for size information according to the first foreground segmentation image.

In an embodiment, the measuring the body portion 121 for size information according to the first foreground segmentation image includes: determining a size of the body portion 121 of the tab 12 in the second direction according to pixel values of each column of pixel points in the second direction in the first foreground segmentation image; and determining a size of the body portion 121 of the tab 12 in the first direction according to pixel values of each row of pixel points in the first direction in the first foreground segmentation image.

Figure 8:
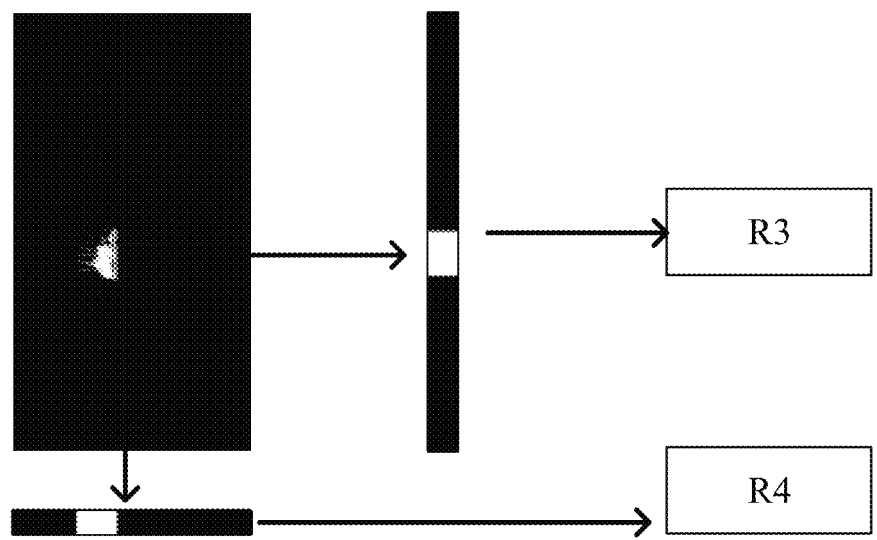
FIG. 8 is a schematic diagram of measuring a size of a body portion according to an embodiment of this application.

FIG. 8 is a schematic diagram of measuring a size of a body portion according to an embodiment of this application. With reference to FIG. 8, the determining a size R4 of the body portion 121 of the tab 12 in the second direction according to pixel values of each column of pixel points in the second direction in the first foreground segmentation image may include: summing or averaging the pixel values of each column of pixel points in the second direction to obtain a row vector, and determining a value of R4 according to the number of non-zero elements in the row vector. For example, in the first foreground segmentation image, the values of the pixel points of the body portion 121 are 1, and the values of the rest of the pixel points are 0. Therefore, the value of R4 may be determined according to the number of non-zero elements in the row vector.

With reference to FIG. 8, the determining a size R3 of the body portion 121 of the tab 12 in the first direction according to pixel values of each row of pixel points in the first direction in the first foreground segmentation image may include: summing or averaging the pixel values of each row of pixel points in the first direction to obtain a column vector, and determining a value of R3 according to the number of non-zero elements in the column vector. For example, in the first foreground segmentation image, the values of the pixel points of the body portion 121 are 1, and the values of the rest of the pixel points are 0. Therefore, the value of R3 may be determined according to the number of non-zero elements in the column vector.

In this embodiment, this helps to quickly and accurately determine the sizes of the body portion 121 of the tab 12 in the first direction and the second direction.

In an embodiment, the measuring the tab 12 for size information according to the second target image includes: performing foreground segmentation on the second target image according to a second threshold and size information about the electrode plate body 11 to obtain a second foreground segmentation image; and measuring the tab 12 for size information according to the second foreground segmentation image.

Figure 9:
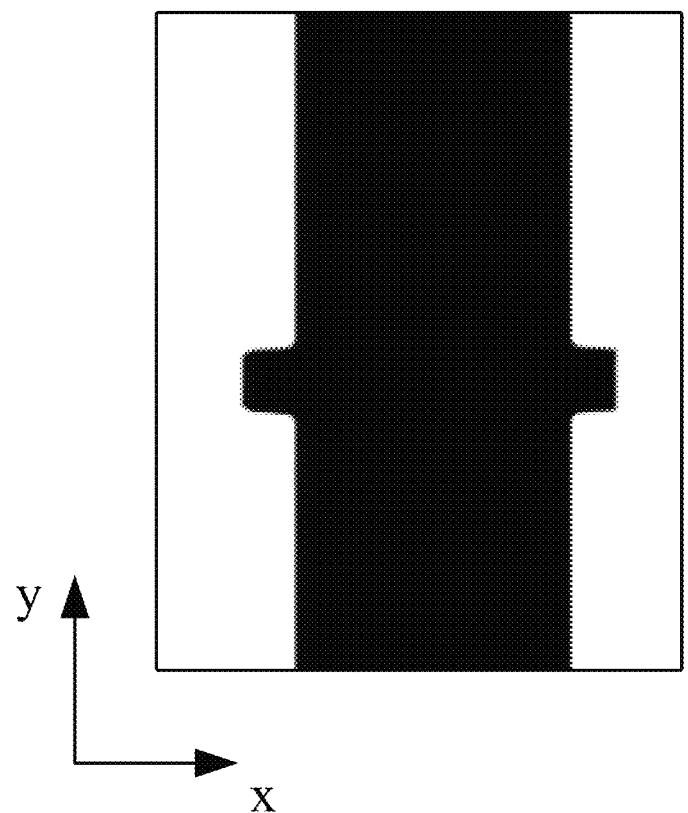
FIG. 9 is a schematic diagram of a second target image according to an embodiment of this application.

FIG. 9 is a schematic diagram of a second target image according to an embodiment of this application. As shown in FIG. 9, a grayscale value of the electrode plate part is less than a second threshold, and a grayscale value of the background in the second target image is greater than or equal to the second threshold. Therefore, according to the second threshold, the electrode plate part can be extracted. The electrode plate body 11 part may be determined according to the size information about the electrode plate body 11, so that the tab part can be extracted.

Optionally, the size information about the electrode plate body 11 can be obtained by using a prior-art measurement method, or by using a measurement method described later in this application.

The performing foreground segmentation on the second target image according to a second threshold and size information about the electrode plate body 11 may specifically be implemented through the following steps. Values of the pixel points with a pixel value greater than or equal to the second threshold in the second target image are set to 0. Afterwards, according to the size information about the electrode plate body 11, values of the pixel points in an area in which the electrode plate body 11 is located are set to 0. After the foregoing steps, the pixel values of the rest of the pixel points are set to 1, and then the second foreground segmentation image with the tab 12 being the foreground area can be obtained.

Optionally, the second threshold may be specifically set as required, for example, set to 1, which is not specifically limited in this embodiment of this application.

Figure 10:
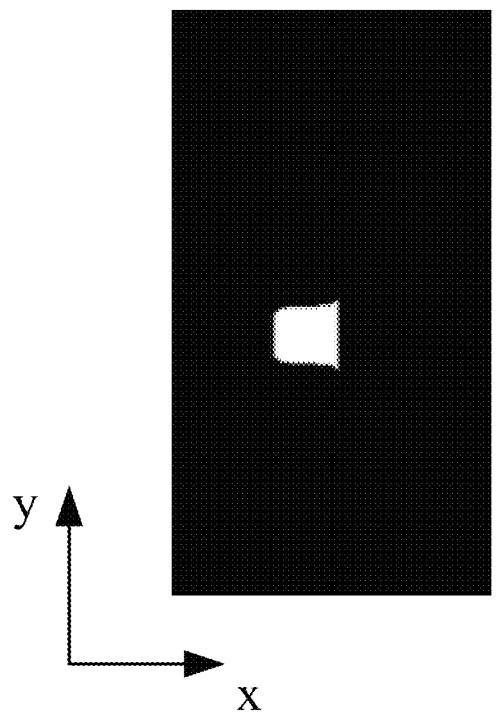
FIG. 10 is a schematic diagram of a second foreground segmentation image according to an embodiment of this application.

FIG. 10 is a schematic diagram of a second foreground segmentation image according to an embodiment of this application. As shown in FIG. 10, in the second foreground segmentation image, the number of tabs 12 in the second direction is 1. In the second foreground segmentation image, pixel points of an area in which the tab 12 is located are foreground pixel points, and the rest of the pixel points are background pixel points.

In this embodiment, by performing foreground segmentation on the second target image, the second foreground segmentation image containing the information about the tab can be obtained accurately and quickly, helping to measure the tab 12 for size information according to the second foreground segmentation image.

Figure 11:
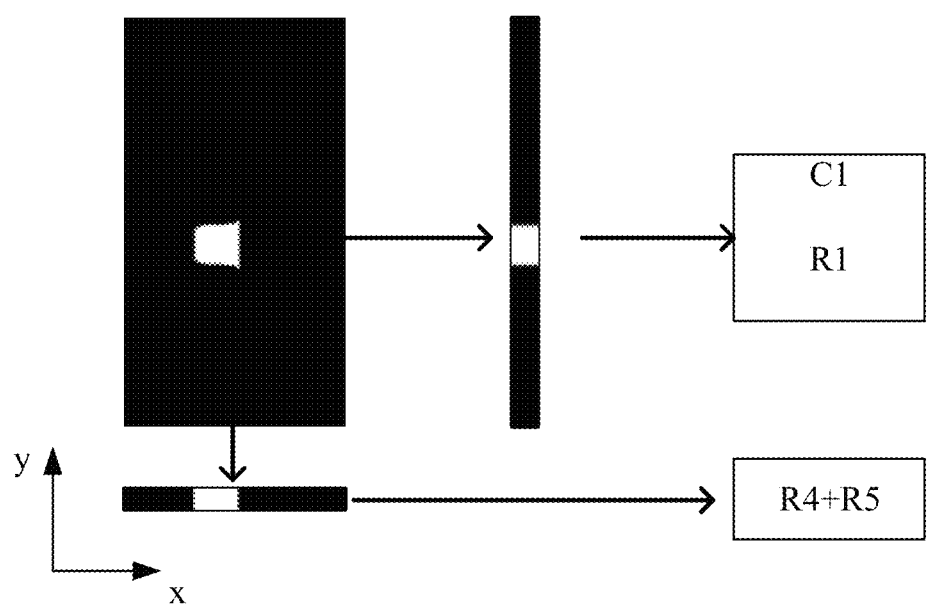
FIG. 11 is a schematic diagram of measuring a tab for size information according to an embodiment of this application.

FIG. 11 is a schematic diagram of measuring a tab for size information according to an embodiment of this application. In an embodiment, as shown in FIG. 11, the measuring the tab 12 for size information according to the second foreground segmentation image includes: determining a size of the tab in the second direction according to pixel values of each column of pixel points in the second direction in the second foreground segmentation image; and determining a size and coordinate of the tab in the first direction according to pixel values of each row of pixel points in the first direction in the second foreground segmentation image.

In this embodiment, a size R4+R5 of the tab in the second direction may be determined according to pixel values of each column of pixel points in the second direction in the second foreground segmentation image. For example, an average of the pixel values of one column of pixel points is one element, averages of the pixel values of n columns of pixel points in the second direction correspond to n elements, and n elements can form a row vector. According to the number of elements in the row vector, the size R4+R5 of the tab 12 in the second direction may be determined. For example, when the pixel values of the foreground pixel points are 1 and the pixel values of the background pixel points are 0, the number of non-zero elements in the row vector is the size R4+R5 of the tab 12 in the second direction.

In this embodiment, the sizes of the tab 12 in the first direction and the second direction and the coordinate of the tab 12 in the first direction can be quickly and accurately determined according to pixel values of each column of pixel points in the second direction and pixel values of each row of pixel points in the first direction in the second foreground segmentation image.

In an embodiment, the determining a size and coordinate of the tab 12 in the first direction according to pixel values of each row of pixel points in the first direction in the second foreground segmentation image includes: determining a size of a first end of the tab 12 according to a number of non-zero elements in a first column vector, where the first end of the tab 12 is an end of the tab closer to the electrode plate body 11 in the second direction, and the first column vector is composed of averages or sums of pixel values of respective rows of pixel points in the first direction in the second foreground segmentation image; and measuring a coordinate of a central position of the tab 12 in the first direction according to coordinates of the non-zero elements in the first column vector.

In the second foreground segmentation image, pixel points of an area in which the tab 12 is located are foreground pixel points, and the pixel points in the rest of areas are background pixel points. Pixel values of the foreground pixel points may be set to 1, and pixel values of the background pixel points may be set to 0. Elements in the first column vector may correspond to an average of the pixel values of each row of pixel points in the first direction in sequence. Since the second foreground segmentation image includes only one tab and the tab is a continuous area, the size R1 of the first end of the tab 12 in the first direction may be determined according to the number of non-zero elements in the first column vector. An ordinate of the central position of the tab 12 may be determined according to an ordinate of a non-zero element in the middle position in the first column vector.

In this embodiment, the size of the first end of the tab 12 and the coordinate of the central position of the tab 12 in the first direction can be quickly and accurately determined according to the first column vector.

In an embodiment, the determining a size and coordinate of the tab 12 in the first direction according to pixel values of each row of foreground pixel points in the first direction in the second foreground segmentation image includes: measuring a size of a second end of the tab 12 according to pixel values of pixel points along the first direction at a first preset position in the second foreground segmentation image, where the second end of the tab 12 is an end of the tab 12 farther away from the electrode plate body 11 in the second direction.

The first preset position may be a position at a distance of a *(R4+R5) from the first end of the tab 12 in the second direction in the second foreground segmentation image, where a may be set according to an empirical value, for example a is 0.9.

In an embodiment, as shown in FIG. 2, FIG. 10, and FIG. 11, in actual production, an area B of the tab 12 closer to the second end is generally in an arc-shaped structure. Therefore, the first preset position may be a position at a distance of R4+R5−R from the first end of the tab 12 in the second direction in the second foreground segmentation image. A value of R may be specifically set as required, which is not specifically limited in this embodiment of this application.

The measuring a size R2 of a second end of the tab 12 according to pixel values of pixel points along the first direction at a first preset position in the second foreground segmentation image may be specifically as follows: the number of foreground pixel points in the first direction (under the condition that pixel values of the foreground pixel points are 1, a sum of the pixel values of the foreground pixel points in the first direction) at the first preset position in the second foreground segmentation image is the size R2 of the second end of the tab 12.

In this embodiment, the size of the second end of the tab 12 can be quickly determined.

In an embodiment, the measuring the tab 12 for size information according to the first target image and the second target image includes: determining a size R5 of the connecting portion 122 of the tab 12 in the first direction according to the size R4 of the body portion 121 of the tab 12 in the second direction and the size R4+R5 of the tab in the second direction. This can quickly and accurately determine the size of the connecting portion 122 of the tab.

In an embodiment, the method 100 further includes: determining a number of the tabs 12 in the first direction in the second image; where the obtaining a first target image according to the first image includes: obtaining the first target image corresponding to each tab 12 in the first direction, according to the number of the tabs 12 in the first direction and the first image; and the obtaining a second target image according to the second image includes: obtaining the second target image corresponding to each tab 12 in the first direction, according to the number of the tabs in the first direction and the second image.

The first image and the second image correspond to a same area of the electrode plate. Therefore, the number of tabs 12 in the first direction in the second image is the same as the number of tabs 12 in the first direction in the first image.

The obtaining the first target image corresponding to each tab 12 in the first direction, according to the number of the tabs 12 in the first direction and the first image may include the following situations.

In one case, the number of tabs 12 in the first direction is 1, and in this case, the first target image is the first image.

In one case, the number of tabs 12 in the first direction is 2, and in this case, the first image needs to be divided, so as to divide the first image into a first target image including a complete tab 12 and a first division image including an incomplete tab 12.

Figure 12:
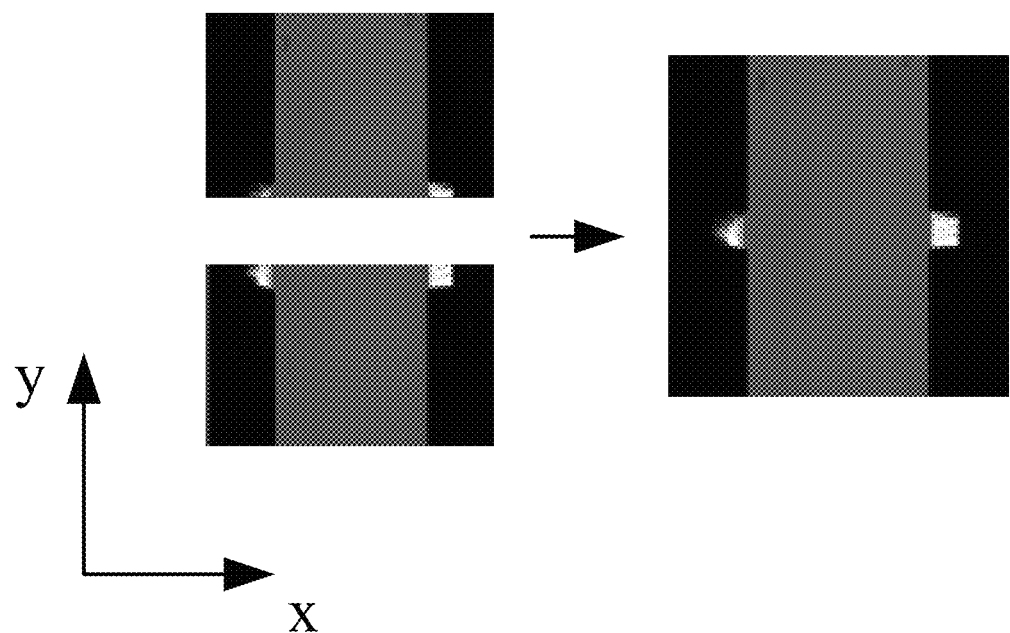
FIG. 12 is a schematic diagram of obtaining a first target image according to an embodiment of this application.

For example, a current first image is divided into two parts. An upper part contains a complete tab 12, and a lower part contains an incomplete tab 12, that is, the lower part is the first division image. FIG. 12 is a schematic diagram of obtaining a first target image according to an embodiment of this application. As shown in FIG. 12, a first division image of the current first image is spliced with a first division image of a next first image to obtain an image containing a complete tab 12 in the first direction, that is, the first target image.

Splicing the first division images to obtain the first target image can ensure that the size of the complete tab 12 is measured, thereby ensuring the accuracy of a result of a measurement of the size of the tab 12.

Optionally, dividing the first image may be equally dividing the first image along the second direction.

Optionally, a size of the first target image is different from a size of the first image in the first direction. For example, in the first direction, the size of the first target image is less than the size of the first image. In this embodiment of this application, the size of the first target image in the first direction may be set according to a division method and an actual situation.

Similarly, in obtaining the second target image corresponding to each tab 12 in the first direction according to the number of the tabs in the first direction and the second image, a situation same as that in obtaining the first target image corresponding to each tab 12 in the first direction according to the number of the tabs 12 in the first direction and the first image may be included, and details are not repeated here.

Figure 13:
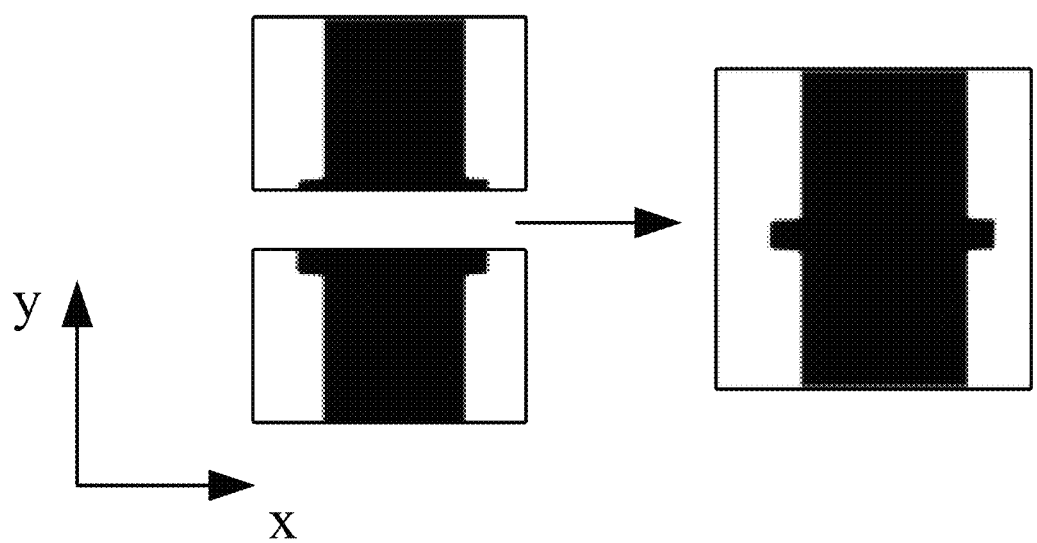
FIG. 13 is a schematic diagram of obtaining a second target image according to an embodiment of this application.

FIG. 13 is a schematic diagram of obtaining a second target image according to an embodiment of this application. As shown in FIG. 13, two incomplete tabs are spliced into a complete tab so that a second target image is obtained.

In this embodiment, the first target image and the second target image need to be determined according to the number of tabs in the first direction. This can ensure that only one complete tab exists in the first direction in the first target image and the second target image, facilitating the measurement of the size of the tab.

In an embodiment, the determining a number of the tabs 12 in the first direction in the second image includes: performing foreground segmentation on the second image according to a second threshold and size information about the electrode plate body 11 to obtain a third foreground segmentation image; and determining the number of the tabs 12 in the first direction according to the third foreground segmentation image.

Figure 14:
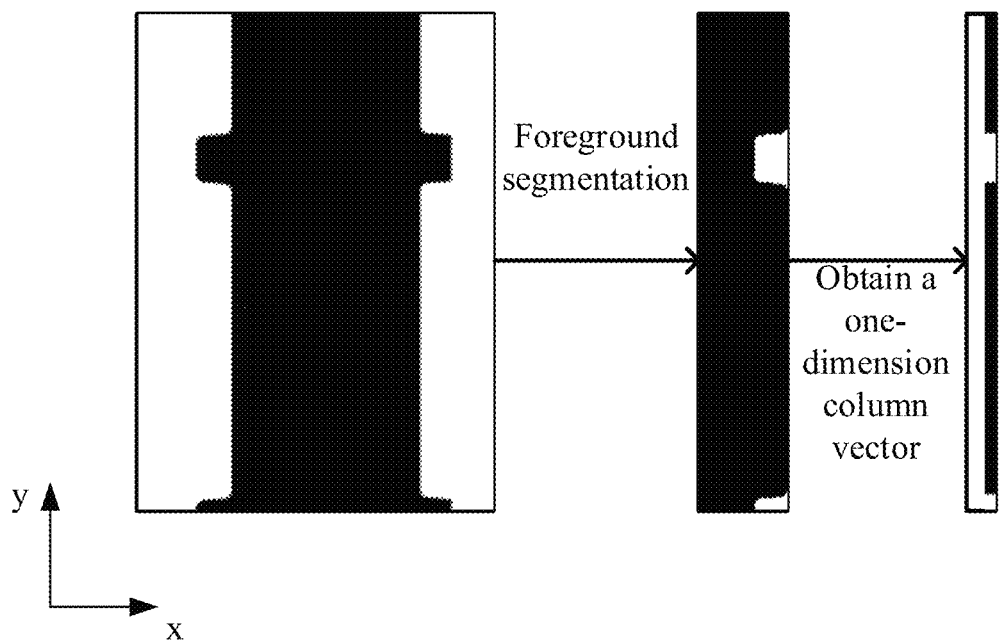
FIG. 14 is a schematic diagram of determining a number of tabs according to an embodiment of this application.

FIG. 14 is a schematic diagram of determining a number of tabs according to an embodiment of this application. As shown in FIG. 14, the third foreground segmentation image is obtained after foreground segmentation is performed on the second image according to the second threshold and the size information about the electrode plate body 11, and then the number of the tabs 12 in the first direction may be determined according to the third foreground segmentation image. The third foreground segmentation image may include only one tab in the second direction. The method in this embodiment helps to quickly determine the number of the tabs in the first direction.

In an embodiment, the determining the number of the tabs in the first direction according to the third foreground segmentation image includes the following situations.

Under the condition that a difference between ordinates of adjacent non-zero elements in a second column vector is greater than a first specified value, the number of the tabs is determined to be 2, where the second column vector is composed of averages or sums of pixel values of respective rows of pixel points in the first direction in the third foreground segmentation image.

For example, the second column vector is formed by the an average of the pixel values of each row of pixel points in the first direction in the third foreground segmentation image, and has n rows of pixel points along the first direction, pixel values of the foreground pixel points are 1, and pixel values of the background pixel points are 0, the second column vector is $H=[h_1, h_2, h_3, \ldots, h_n]$, and a difference between ordinates of adjacent elements in the second column vector is one pixel. For example, an ordinate of $h_1$ is 1, an ordinate of $h_2$ is 2, ..., and an ordinate of $h_n$ is n. According to the second column vector, non-zero elements in the second column vector may be determined. For example, the non-zero elements may form a column vector $H1=[h_3, h_4, h_5, \ldots h_m, h_n]$, where m is less than n. Therefore, the number of tabs may be determined according to a difference between ordinates in the second column vector H corresponding to adjacent elements in the column vector H1 or a difference between ordinates of adjacent non-zero elements in the second column vector H. Under the condition that a difference between ordinates of adjacent non-zero elements in a second column vector is greater than a first specified value, it may be determined that 2 tabs are included in the third foreground segmentation image or the second image in the first direction.

Under the condition that a difference between ordinates of adjacent non-zero elements in the second column vector is less than or equal to the first specified value, the number of the tabs is determined to be 1.

The method in this embodiment helps to accurately and quickly determine the number of the tabs in the first direction.

In an embodiment, before the measuring the tab for size information according to the first target image and the second target image, the method 100 further includes: measuring the electrode plate body 11 for size information according to the first image; and/or measuring the electrode plate body 11 for size information according to the second image. In this way, the measured size information about the electrode plate body 11 helps to measure the tab 12 for size information according to the size information about the electrode plate body 11, and also helps to inspect, according to the size information about the electrode plate body 11, whether the electrode plate 1 has a defect.

In an embodiment, the measuring the electrode plate body 11 for size information according to the second image includes: performing foreground segmentation on the second image according to a second threshold to obtain a fourth foreground segmentation image; and measuring the electrode plate body 11 for size information according to pixel values of each column of pixel points in the second direction in the fourth foreground segmentation image.

In this embodiment, according to the second threshold, the electrode plate 1 in the second image can be extracted as a foreground area so that the fourth foreground segmentation image is obtained, helping to measure the electrode plate body 11 for size information according to the fourth foreground segmentation image.

In an embodiment, the measuring the electrode plate body 11 for size information according to pixel values of each column of pixel points in the second direction in the fourth foreground segmentation image includes: obtaining a first row vector, where the first row vector is composed of sums or averages of pixel values of respective columns of pixel points in the second direction in the fourth foreground segmentation image; setting elements with a value less than a second specified value in the first row vector to 0; and determining size information about the electrode plate body 11 according to non-zero elements in the first row vector.

Figure 15:
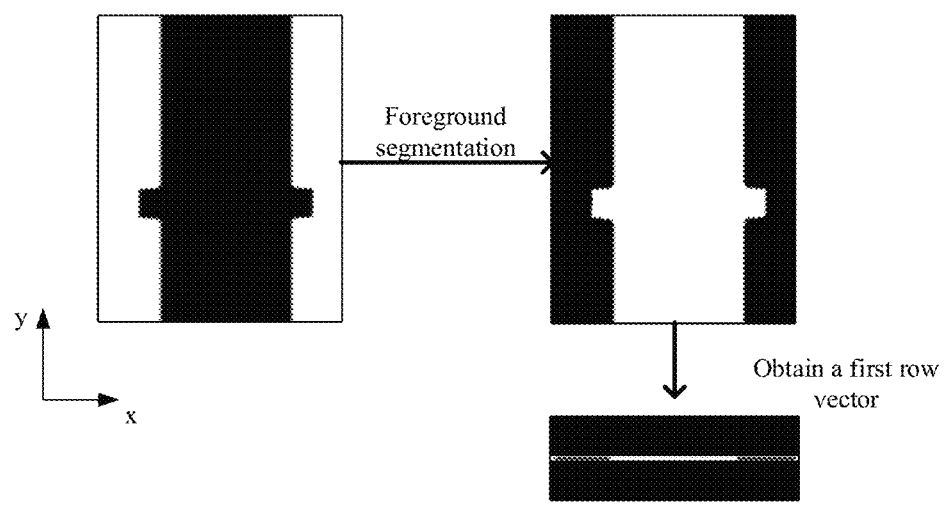
FIG. 15 is a schematic diagram of measuring an electrode plate body for size information according to an embodiment of this application.

FIG. 15 is a schematic diagram of measuring an electrode plate body for size information according to an embodiment of this application. As shown in FIG. 15, a fourth foreground segmentation image is obtained after the foreground segmentation is performed on the second image according to a second threshold. For example, an average of pixel values of one column of pixel points in the second direction in the fourth foreground segmentation image is one element in the first row vector, and has n columns of pixel points in the second direction, and averages of pixel values of the n columns of pixel points constitute n elements in the first row vector. For example, a difference between abscissas of adjacent elements in the first row vector $P=[p_1, p_2, p_3, \ldots, p_n]$ is one pixel point, an abscissa of $p_1$ is 1, an abscissa of $p_2$ is 2, ..., and an abscissa of $p_n$ is n. Generally, pixel values of background pixel points are 0, and pixel values of foreground pixel points may be set as required, for example, set to 1. After the first row vector is obtained, elements in the first row vector element value less than a second specified value elements are set to 0. In this way, the size of the electrode plate body 11 in the second direction may be determined according to the number of non-zero elements in the first row vector. With coordinates of the non-zero elements, for example, with abscissas of a first element and a last element in the first row vector, an abscissa of a boundary of the electrode plate body 11 in the second direction may be determined.

Under the situation that the pixel values of the foreground pixel points are 1, when the elements in the first row vector are an average of pixel values of each column of pixel points, the second specified value may be 0.9 or another empirical value. Accordingly, when the elements in the first row vector are an average of pixel values of each column of pixel points, the second specified value may be 0.9n or another empirical value, where n is the number of columns of pixel points in the fourth foreground segmentation image in the second direction.

When the electrode plate has a defect such as a black spot or a crack, measuring the electrode plate body for size information according to the first image may cause a measured size of the electrode plate body to be small. Compared with measuring the electrode plate body 11 for size information according to the first image, measuring the electrode plate body 11 for size information according to the second image can obtain more accurate size information.

In this embodiment, using the second specified value can prevent the mark hole on the electrode plate and the like from affecting the size information about the electrode plate body.

Generally, mark holes are provided at a start position and an end position of the electrode plate, through which start and end positions for tab counting may be determined.

In actual production, a roll of material may contain multiple sequentially connected and continuous electrode plates 1, and each electrode plate has a specific length, that is, each electrode plate 1 has a specific length in the first direction. To facilitate identification of each electrode plate and determine the number of tabs 12 in the first direction on each electrode plate 1, mark holes are generally provided on each electrode plate 1. The mark holes may be used to mark each electrode plate 1 and may be used as a mark to start counting of the tabs 12 and a mark to end the counting of the tabs 12.

In an embodiment, the method 100 further includes: measuring a mark hole on the electrode plate for size information. This helps to determine a start position and an end position of the electrode plate according to the mark hole.

In an embodiment, the measuring a mark hole on the electrode plate 1 for size information includes: performing foreground segmentation on the second image according to the second threshold and the fourth foreground segmentation image to obtain a fifth foreground segmentation image; and determining a size and coordinate of the mark hole in the first direction and a size and coordinate of the mark hole in the second direction according to pixel values of each column of pixel points in the second direction and pixel values of each row of pixel points in the first direction in the fifth foreground segmentation image.

Figure 16:
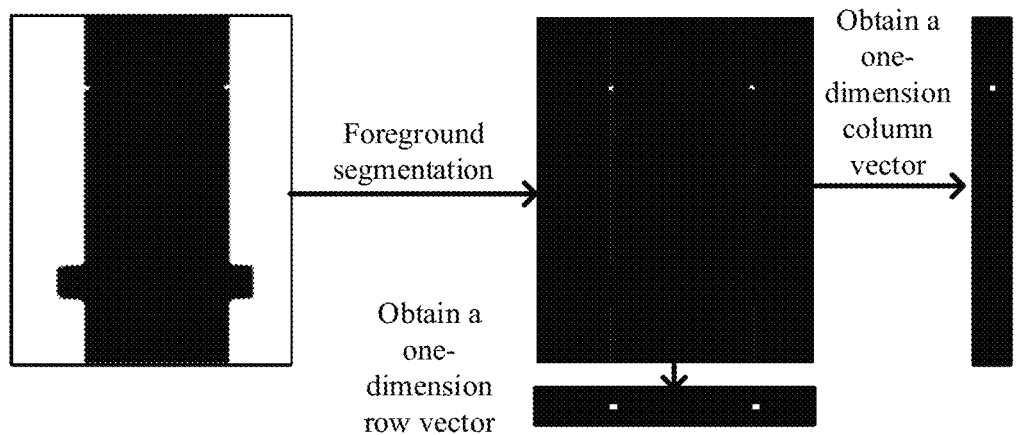
FIG. 16 is a schematic diagram of measuring a mark hole for size information according to an embodiment of this application.

FIG. 16 is a schematic diagram of measuring a mark hole for size information according to an embodiment of this application. As shown in FIG. 16, areas other than the electrode plate in the second image are set as a background according to an area of the electrode plate in the fourth foreground segmentation image. In this way, in the second image, the areas other than the electrode plate are background pixel points. Afterwards, according to the second threshold, the mark hole is extracted as a foreground area. For example, a pixel value of the mark hole is greater than or equal to the second threshold, and pixel values of the electrode plate are less than the second threshold. In this way, the mark hole can be extracted according to the second threshold to obtain the fifth foreground segmentation image.

In the fifth foreground image, an average of pixel values of each column of pixel points in the second direction constitutes an element in a one-dimensional row vector, and an average of pixel values of each row of pixel points in the first direction constitutes an element in a one-dimensional column vector. According to the number of non-zero elements in the one-dimensional column vector, a size of the mark hole in the first direction may be determined, and according to coordinates of a non-zero element in the middle position in the one-dimensional column vector, a coordinate of the mark hole in the first direction may be determined.

The method in this embodiment helps to quickly and accurately measure the size and coordinate of the mark hole.

In an embodiment, the measuring the electrode plate body 11 for size information according to the first image includes: performing foreground segmentation on the first image according to a third threshold to obtain a sixth foreground segmentation image; and measuring the electrode plate body 11 for size information according to pixel values of each column of pixel points in the second direction in the sixth foreground segmentation image.

The performing foreground segmentation on the first image according to a third threshold may specifically include the following steps. In the first image, pixel points with a pixel value greater than or equal to the third threshold are set as foreground pixel points, where the pixel values of the foreground pixel points are set to 1; and pixel points with a pixel value less than the third threshold are set as background pixel points, where pixel values of the background pixel points are set to 0. In this way, the sixth foreground segmentation image is obtained by performing foreground segmentation on the first image according to the third threshold.

The third threshold is less than the first threshold, and the third threshold may be specifically set according to pixel values of pixels in the first image. For example, the third threshold is 5. In this way, with the third threshold set, an area in which the electrode plate in the first image is located can be extracted as a foreground area.

According to pixel values of each column of pixel points in the second direction in the sixth foreground segmentation image, a size, coordinate, and the like of the electrode plate body 11 in the second direction can be measured.

In this embodiment, according to the third threshold, the electrode plate in the first image can be extracted as a foreground so that the sixth foreground segmentation image is obtained, helping to measure the electrode plate body for size information according to the sixth foreground segmentation image.

In an embodiment, the measuring the electrode plate body 11 for size information according to pixel values of each column of pixel points in the second direction in the sixth foreground segmentation image includes: obtaining a second row vector, where the second row vector is composed of sums or averages of pixel values of respective columns of pixel points in the second direction in the sixth foreground segmentation image; setting elements with a value less than a second specified value in the second row vector to 0; and determining size information about the electrode plate body according to non-zero elements in the second row vector.

Figure 17:
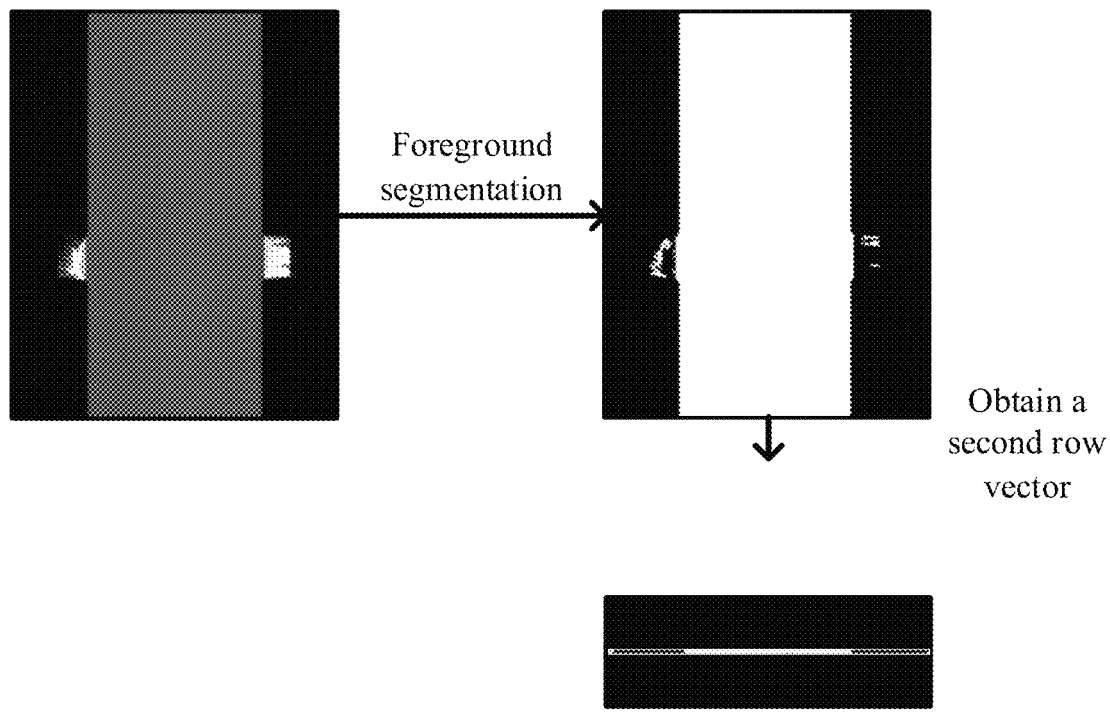
FIG. 17 is a schematic diagram of determining size information about an electrode plate body according to an embodiment of this application.

FIG. 17 is a schematic diagram of determining size information about an electrode plate body according to an embodiment of this application. As shown in FIG. 17, a sixth foreground segmentation image is obtained after foreground segmentation on the first image is performed. In the sixth foreground segmentation image, pixel values of the foreground pixel points are 1, and pixel values of the background pixel points are 0. In the sixth foreground segmentation image, averages of pixel values of respective columns of pixel points along the second direction constitute a second row vector, and elements in the second row vector are either 0 or 1. Due to continuity of the electrode plate body 11 in the second direction, a size of the electrode plate body 11 in the second direction may be determined according to the number of non-zero elements in the second row vector.

Due to the presence of tabs, averages of pixel values of some columns of pixel points are less than 1. Therefore, elements in the second row vector that are less than the second specified value are set to 0, so that a size of the electrode plate body 11 in the second direction may be determined according to the number of non-zero elements in the second row vector. A boundary coordinate of the electrode plate body 11 in the second direction may be determined according to abscissas of a first non-zero element and a last non-zero element in the second row vector.

In this embodiment, this helps to quickly and accurately determine the size information about the electrode plate body 11, and whether the electrode plate has a defect caused by die-cutting can be also detected according to the size information about the electrode plate body.

In an embodiment, the measured size information about the electrode plate body according to the second image is compared with the measured size information about the electrode plate body according to the first image, and whether an exception occurs during a process of acquiring the first image and the second image may be determined according to a comparison result.

In an embodiment, whether the electrode plate has a defect can be detected according to a comparison between the size information about the electrode plate body measured according to the second image and preset size information about the electrode plate body. Similarly, whether the electrode plate has a defect can be detected according to a comparison between the electrode plate body measured according to the first image and preset size information about the electrode plate body. For example, under the condition that the size of the electrode plate body in the second direction measured according to the first image is less than the preset size of the electrode plate body in the second direction, it may be determined that there is a problem in the die-cutting process of the electrode plate, resulting that an actual size of the electrode plate body is less than the preset size of the electrode plate body.

In an embodiment, the method 100 further includes: performing foreground segmentation on the first image according to a first threshold to obtain a seventh foreground segmentation image; determining a number of non-zero elements in a third column vector according to the seventh foreground segmentation image, where the third column vector is composed of averages or sums of pixel values of respective rows of pixel points in the first direction in the seventh foreground segmentation image; and determining whether the electrode plate has a residual material defect, according to the number of non-zero elements in the third column vector.

A residual material defect in the electrode plate may mean at least one of the following: an active substance should be applied onto the electrode plate body 11 but actually is not; an active substance should not be applied onto a body portion 121 of the tab 12, but is actually applied; or an active substance is not applied onto either the electrode plate body 11 or the connecting portion 122 of the tab 12 (that is, coating is missed). For example, in a process of coating the electrode plate, there is a deviation, such as right or left deviation along the second direction, resulting that the active substance is present on the body portion 121 of the tab 12 and no active substance is present in some areas of the electrode plate body 11.

Figure 18:
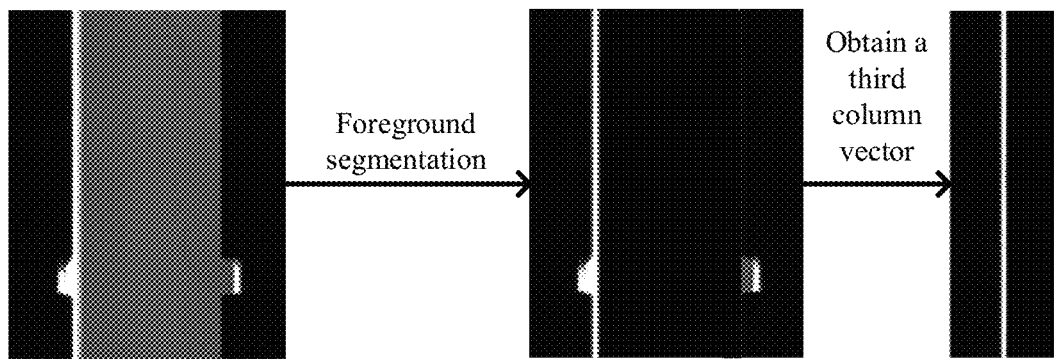
FIG. 18 is a schematic diagram of determining that an electrode plate has a residual material defect according to an embodiment of this application.

FIG. 18 is a schematic diagram of determining that an electrode plate has a residual material defect according to an embodiment of this application. As shown in FIG. 18, foreground segmentation is performed on a first image according to a first threshold, to extract the part of the electrode plate not coated with the active substance as a foreground area so that a seventh foreground segmentation image is obtained. In the seventh foreground segmentation image, an average of pixel values of each row of pixel points in the first direction constitute elements in the third column vector. In the seventh foreground segmentation image, pixel values of the foreground pixel points are 1, and pixel values of the background pixel points are 0. The number of non-zero elements in the third column vector may be used to determine whether the electrode plate has a residual material defect.

In this embodiment, this helps to determine a size of the foreground area in the seventh foreground segmentation image according to the seventh foreground segmentation image, thereby determining, according to the size of the foreground area, whether a residual material defect exists.

In an embodiment, the determining whether the electrode plate has a residual material defect, according to the number of non-zero elements in the third column vector includes: under the condition that the number of non-zero elements in the third column vector is greater than the third specified value, determining that the electrode plate has a residual material defect.

The third specified value may be a size R3 of the body portion 121 of the tab 12 in the first direction. Under the condition that the number of non-zero elements in the third column vector is greater than R3, it may be determined that the electrode plate 1 has a residual material defect.

In this embodiment, this helps to quickly and accurately determine whether the electrode plate 1 has a residual material defect.

In an embodiment, the method 100 further includes: determining a number of tabs 12 in the first direction according to the coordinate of the mark hole on the electrode plate 1 and the coordinate of the tab 12. This helps to determine the number of tabs 12 in the first direction and inspect whether the electrode plate 1 meets a requirement according to the number of tabs 12 in the first direction.

In an embodiment, before the measuring the target object for size information according to the first image and the second image, the method further includes: performing grayscale homogenization processing on the first image.

Optionally, the grayscale homogenization processing may stretch grayscale values of different first images into a unified grayscale space using a grayscale histogram stretching method. The grayscale homogenization processing method is not specifically limited in this application, as long as grayscale value of different first images can be within a unified range.

Due to lighting and light effects, grayscale values of different first images are in different ranges. The grayscale values of the different first images are unified into a range through grayscale homogenization processing, which is beneficial to subsequent operations of the measurement method, for example, the setting of the first threshold and the third threshold and the execution of foreground segmentation.

In an embodiment, before the acquiring a first image and a second image of a target object, the method 100 further includes: acquiring a backlight image and a non-backlight image; and compressing the backlight image and the non-backlight image according to a first ratio to obtain the first image and the second image. In this way, measurement methods can be run faster while preserving image information.

The first ratio may be specifically set according to an empirical value or an actual situation, which is not specifically limited in this embodiment of this application.

In an embodiment, the method 100 further includes: outputting the size information on the target object according to the first ratio.

The outputting the size information on the target object according to the first ratio may include: after the size information about the target object is obtained by measurement, multiplying a measured size by the first ratio to obtain an actual size of the target object.

In this embodiment, the actual size information can be restored from the measured size information according to the first ratio.

Figure 19:
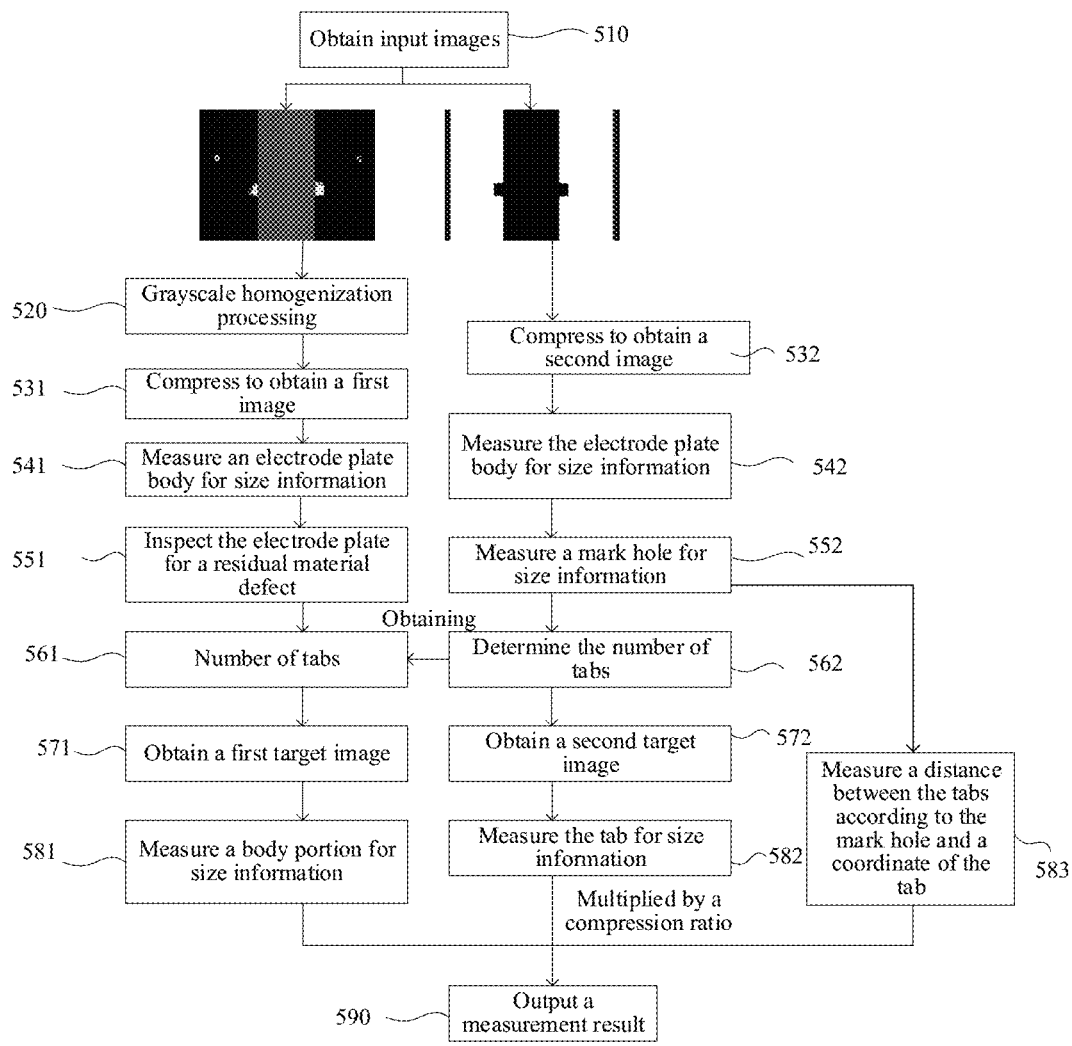
FIG. 19 is a schematic diagram of a measurement method according to an embodiment of this application.

FIG. 19 is a schematic diagram of a measurement method according to an embodiment of this application. As shown in FIG. 19, a measurement method 500 includes the following steps.

Step 510. Obtain input images.

The input images include a backlight image and a non-backlight image, where the non-backlight image is a grayscale image, and the backlight image is a grayscale image close to a black-and-white image.

The input images are respectively acquired by two cameras at different positions. The backlight image is acquired by a camera on a backlight side, and the non-backlight image is acquired by a camera located on a non-backlight side. These two cameras are both line scan cameras and are located over and/or under an electrode plate.

Step 520. Perform grayscale homogenization processing on a non-backlight image.

Step 531. Compress the non-backlight image to obtain a first image.

Step 532. Compress a backlight image to obtain a second image.

Step 541. Measure an electrode plate body for size information according to the first image.

Step 542. Measure the electrode plate body for size information according to the second image.

Step 551. Inspect the electrode plate for a residual material defect according to the first image.

In step 551, the inspecting the electrode plate for a residual material defect according to the first image is to inspect whether a coating deviation has occurred.

Step 552. Inspect whether a mark hole exists on the electrode plate according to the second image and measure the mark hole for size information.

Step 561. Obtain a number of tabs in the first direction.

Step 562. Determine the number of tabs in the first direction according to the second image.

For specific methods related to the number of tabs in the first direction in step 561 and step 562, reference may be made to the foregoing description, and details are not repeated herein.

Step 571: Obtain a first target image.

Step 572: Obtain a second target image.

Step 581. Measure a body portion of the tab for size information according to the first target image.

Step 582. Measure the tab for size information according to the second target image.

Step 583. Measure a distance between the tabs in the first direction according to the size information about the mark hole and a coordinate of the tab.

Step 590. Output a measurement result.

The foregoing has described in detail the method embodiments of this application with reference to FIG. 1 to FIG. 19, and the following describes in detail measurement apparatus embodiments of this application. It should be understood that the method embodiments correspond to the apparatus embodiments, and similar descriptions may refer to the method embodiments.

Figure 20:
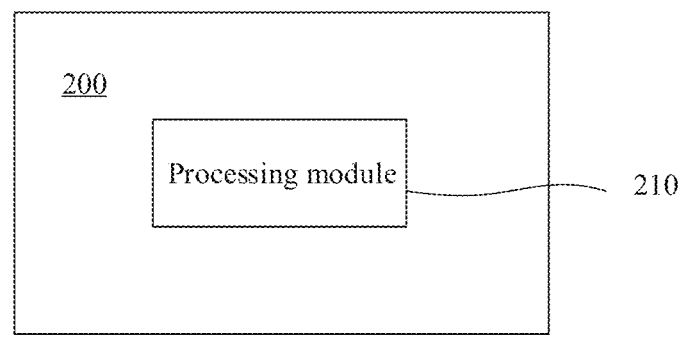
FIG. 20 is a schematic diagram of a measurement apparatus according to an embodiment of this application.

FIG. 20 is a schematic diagram of a measurement apparatus according to an embodiment of this application. As shown in FIG. 20, an embodiment of this application provides a measurement apparatus 200, including a processing module 210, where the processing module 210 is configured to: acquire a first image and a second image of a target object, where the first image is acquired by a camera located on a non-backlight side of the target object, and the second image is acquired by a camera located on a backlight side of the target object; and measure the target object for size information according to the first image and the second image.

In an embodiment, the target object is an electrode plate 1. The electrode plate 1 includes an electrode plate body 11 and a tab 12. The tab 12 includes a body portion 121 and a connecting portion 122. The electrode plate body 11 extends along a first direction. The tab 12 protrudes from the electrode plate body 11 along a second direction. The body portion 121 of the tab 12 is connected to the electrode plate body 11 via the connecting portion 122. The electrode plate body 11 and the connecting portion 122 are coated with an active substance, and the body portion 121 is not coated with the active substance. The first direction is a conveying direction of the electrode plate 1, and the second direction is perpendicular to the first direction.

In an embodiment, the processing module 210 is configured to: obtain a first target image according to the first image, the first target image including one such tab 12 in the first direction; obtain a second target image according to the second image, the second target image including one such tab 12 in the first direction; and measure the tab 12 for size information according to the first target image and the second target image.

In an embodiment, the processing module 210 is configured to: measure the body portion 121 of the tab 12 for size information according to the first target image; and measure the tab 12 for size information according to the second target image.

In an embodiment, the processing module 210 is configured to: perform foreground segmentation on the first target image according to a first threshold to obtain a first foreground segmentation image; and measure the body portion 121 for size information according to the first foreground segmentation image.

In an embodiment, the processing module 210 is configured to: determine a size of the body portion 121 of the tab 12 in the second direction according to pixel values of each column of pixel points in the second direction in the first foreground segmentation image; and determine a size of the body portion 121 of the tab 12 in the first direction according to pixel values of each row of pixel points in the first direction in the first foreground segmentation image.

In an embodiment, the processing module 210 is configured to: perform foreground segmentation on the second target image according to a second threshold and size information about the electrode plate body 11 to obtain a second foreground segmentation image; and measure the tab 12 for size information according to the second foreground segmentation image.

In an embodiment, the processing module 210 is configured to: determine a size of the tab in the second direction according to pixel values of each column of pixel points in the second direction in the second foreground segmentation image; and determine a size and coordinate of the tab in the first direction according to pixel values of each row of pixel points in the first direction in the second foreground segmentation image.

In an embodiment, the processing module 210 is configured to: determine a size of a first end of the tab according to the number of non-zero elements in a first column vector, where the first end of the tab is an end of the tab closer to the electrode plate body in the second direction, and the first column vector is composed of averages or sums of pixel values of respective rows of pixel points in the first direction in the second foreground segmentation image; and measure a coordinate of a central position of the tab in the first direction according to coordinates of the non-zero elements in the first column vector.

In an embodiment, the processing module 210 is configured to: measure a size of a second end of the tab according to pixel values of pixel points along the first direction at a first preset position in the second foreground segmentation image, where the second end of the tab is an end of the tab farther away from the electrode plate body in the second direction.

In an embodiment, the processing module 210 is configured to: determine a size of the connecting portion of the tab in the second direction according to the size of the body portion of the tab in the second direction and the size of the tab in the second direction.

In an embodiment, the processing module 210 is configured to: determine a number of the tabs in the first direction in the second image; obtain the first target image corresponding to each tab in the first direction, according to the number of the tabs in the first direction and the first image; and obtain the second target image corresponding to each tab in the first direction, according to the number of the tabs in the first direction and the second image.

In an embodiment, the processing module 210 is configured to: perform foreground segmentation on the second image according to a second threshold and size information about the electrode plate body to obtain a third foreground segmentation image; and determine the number of the tabs in the first direction according to the third foreground segmentation image.

In an embodiment, the processing module 210 is configured to: under the condition that a difference between ordinates of adjacent elements in a second column vector is greater than a first specified value, determine that the number of the tabs is 2, where the first column vector is composed of averages or sums of pixel values of respective rows of foreground pixel points in the first direction in the third foreground segmentation image; or, under the condition that a difference between ordinates of adjacent elements in the second column vector is less than or equal to the first specified value, determine that the number of the tabs is 1.

In an embodiment, the processing module 210 is configured to: before the measuring the tab for size information according to the first target image and the second target image, measure the electrode plate body for size information according to the first image; and/or measure the electrode plate body for size information according to the second image.

In an embodiment, the processing module 210 is configured to: perform foreground segmentation on the second image according to a second threshold to obtain a fourth foreground segmentation image; and measure the electrode plate body for size information according to pixel values of each column of pixel points in the second direction in the fourth foreground segmentation image.

In an embodiment, the processing module 210 is configured to: obtain a first row vector, where the first row vector is composed of sums or averages of pixel values of respective columns of pixel points in the second direction in the fourth foreground segmentation image; set elements with a value less than a second specified value in the first row vector to 0; and determine size information about the electrode plate body according to non-zero elements in the first row vector.

In an embodiment, the processing module 210 is configured to: measure a mark hole on the electrode plate for size information.

In an embodiment, the processing module 210 is configured to: perform foreground segmentation on the second image according to the second threshold and the fourth foreground segmentation image to obtain a fifth foreground segmentation image; and determine a size and coordinate of the mark hole in the first direction and a size and coordinate of the mark hole in the second direction according to pixel values of each column of pixel points in the second direction and pixel values of each row of pixel points in the first direction in the fifth foreground segmentation image.

In an embodiment, the processing module 210 is configured to: perform foreground segmentation on the first image according to a third threshold to obtain a sixth foreground segmentation image; and measure the electrode plate body for size information according to pixel values of each column of pixel points in the second direction in the sixth foreground segmentation image.

In an embodiment, the processing module 210 is configured to: obtain a second row vector, where the second row vector is composed of sums or averages of pixel values of respective columns of pixel points in the second direction in the sixth foreground segmentation image; set elements with a value less than a second specified value in the second row vector to and determine size information about the electrode plate body according to the non-zero elements in the second row vector.

In an embodiment, the processing module 210 is configured to: perform foreground segmentation on the first image according to a first threshold to obtain a seventh foreground segmentation image; determine a number of non-zero elements in a third column vector according to the seventh foreground segmentation image, where the third column vector is composed of averages or sums of pixel values of respective rows of pixel points in the first direction in the seventh foreground segmentation image; and determine whether the electrode plate has a residual material defect, according to the number of non-zero elements in the third column vector.

In an embodiment, the processing module 210 is configured to: under the condition that the number of non-zero elements in the third column vector is greater than the third specified value, determine that the electrode plate has a residual material defect.

In an embodiment, the processing module 210 is configured to: determine a number of tabs in the first direction according to the coordinate of the mark hole on the electrode plate and the coordinate of the tab.

In an embodiment, the processing module 210 is configured to: perform grayscale homogenization processing on the first image.

In an embodiment, the processing module 210 is configured to: before a first image and a second image of a target object are acquired, acquire a backlight image and a non-backlight image; and compress the backlight image and the non-backlight image according to a first ratio to obtain the first image and the second image, and compress the first image and the second image according to the first ratio.

In an embodiment, the processing module 210 is configured to: restore actual size information about the target object from the measured size information about the target object according to the first ratio.

Figure 21:
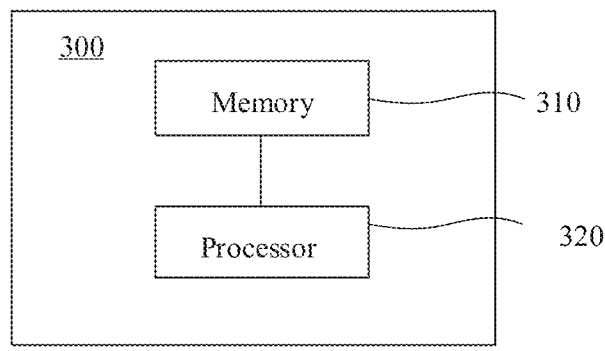
FIG. 21 is a schematic diagram of a measurement apparatus according to an embodiment of this application.

FIG. 21 is a schematic diagram of a measurement apparatus according to an embodiment of this application. As shown in FIG. 21, in this embodiment of this application, the measurement apparatus 300 includes a memory 310 and a processor 320. The memory 310 is configured to store computer-executable instructions; and the processor 320 is configured to access the memory and execute the computer-executable instructions, to perform the operations in the image processing method in any of the foregoing embodiments.

The processor 320 in this embodiment of this application may be an integrated circuit chip with a signal processing capability. In an implementation process, steps in the foregoing method embodiments can be implemented by using a hardware integrated logic circuit in the processor, or by using instructions in a form of software. The foregoing processor may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or execute methods and steps disclosed in the embodiments of this application. The general-purpose processor may be a microprocessor, or the processor may also be any conventional processor or the like. The steps of the methods disclosed with reference to the embodiments of this application may be directly implemented by a hardware decoding processor, or may be implemented by a combination of hardware and software modules in a decoding processor. The software module may be located in a storage medium mature in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

The memory 310 in this embodiment of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random-access memory (Random Access Memory, RAM) and is used as an external cache. Through illustrative but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct Rambus random access memory (Direct Rambus RAM, DR RAM). It should be noted that the memory of the systems and methods described in this specification includes but is not limited to these and any other proper types of memories.

An embodiment of this application provides a storage medium configured to store a computer program, and when the computer program is executed by a computing device, the computing device is enabled to implement the method according to any of the first aspect.

Although this application has been described with reference to the preferred embodiments, various modifications to this application and replacements with equivalents of the components herein can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A measurement method, comprising:
   acquiring a first image and a second image of a target object, wherein the first image is acquired by a camera located on a non-backlight side of the target object, and the second image is acquired by a camera located on a backlight side of the target object; and
   measuring the target object for size information according to the first image and the second image,
   wherein the target object is an electrode plate, wherein the electrode plate comprises an electrode plate body and a tab, the tab comprises a body portion and a connecting portion, the electrode plate body extends along a first direction, the tab protrudes from the electrode plate body along a second direction, the body portion of the tab is connected to the electrode plate body via the connecting portion, the electrode plate body and the connecting portion are coated with an active substance, and the body portion is not coated with the active substance, the first direction is a conveying direction of the electrode plate, and the second direction is perpendicular to the first direction.

2. The measurement method according to claim 1, wherein the measuring the target object for size information according to the first image and the second image comprises:
   obtaining a first target image according to the first image, the first target image comprising one such tab in the first direction;
   obtaining a second target image according to the second image, the second target image comprising one such tab in the first direction; and
   measuring the tab for size information according to the first target image and the second target image.

3. The measurement method according to claim 2, wherein the measuring the tab for size information according to the first target image and the second target image comprises:
   measuring the body portion of the tab for size information according to the first target image; and
   measuring the tab for size information according to the second target image.

4. The measurement method according to claim 3, wherein the measuring the body portion of the tab for size information according to the first target image comprises:
   performing foreground segmentation on the first target image according to a first threshold to obtain a first foreground segmentation image; and
   measuring the body portion for size information according to the first foreground segmentation image.

5. The measurement method according to claim 4, wherein the measuring the body portion for size information according to the first foreground segmentation image comprises:
   determining a size of the body portion of the tab in the second direction according to pixel values of each column of pixel points in the second direction in the first foreground segmentation image; and
   determining a size of the body portion of the tab in the first direction according to pixel values of each row of pixel points in the first direction in the first foreground segmentation image.

6. The measurement method according to claim 3, wherein the measuring the tab for size information according to the second target image comprises:
   performing foreground segmentation on the second target image according to a second threshold and size information about the electrode plate body to obtain a second foreground segmentation image; and
   measuring the tab for size information according to the second foreground segmentation image.

7. The measurement method according to claim 6, wherein the measuring the tab for size information according to the second foreground segmentation image comprises:
   determining a size of the tab in the second direction according to pixel values of each column of pixel points in the second direction in the second foreground segmentation image; and
   determining a size and coordinate of the tab in the first direction according to pixel values of each row of pixel points in the first direction in the second foreground segmentation image.

8. The measurement method according to claim 7, wherein the determining a size and coordinate of the tab in the first direction according to pixel values of each row of pixel points in the first direction in the second foreground segmentation image comprises:
   determining a size of a first end of the tab according to a number of non-zero elements in a first column vector, wherein the first end of the tab is an end of the tab closer to the electrode plate body in the second direction, and the first column vector is composed of averages or sums of pixel values of respective rows of pixel points in the first direction in the second foreground segmentation image; and
   measuring a coordinate of a central position of the tab in the first direction according to coordinates of the non-zero elements in the first column vector.

9. The measurement method according to claim 8, wherein the determining a size and coordinate of the tab in the first direction according to pixel values of each row of foreground pixel points in the first direction in the second foreground segmentation image comprises:
   measuring a size of a second end of the tab according to pixel values of pixel points along the first direction at a first preset position in the second foreground segmentation image, wherein the second end of the tab is an end of the tab farther away from the electrode plate body in the second direction.

10. The measurement method according to claim 2, wherein the measuring the tab for size information according to the first target image and the second target image comprises:
    determining a size of the connecting portion of the tab in the second direction according to the size of the body portion of the tab in the second direction and the size of the tab in the second direction.

11. The measurement method according to claim 2, wherein the method further comprises: determining a number of the tabs in the first direction in the second image; wherein
    the obtaining a first target image according to the first image comprises:
    obtaining the first target image corresponding to each tab in the first direction, according to the number of the tabs in the first direction and the first image; and
    the obtaining a second target image according to the second image comprises:
    obtaining the second target image corresponding to each tab in the first direction, according to the number of the tabs in the first direction and the second image.

12. The measurement method according to claim 11, wherein the determining a number of the tabs in the first direction in the second image comprises:
    performing foreground segmentation on the second image according to a second threshold and size information about the electrode plate body to obtain a third foreground segmentation image; and
    determining the number of the tabs in the first direction according to the third foreground segmentation image.

13. The measurement method according to claim 12, wherein the determining the number of the tabs in the first direction according to the third foreground segmentation image comprises:

under the condition that a difference between ordinates of adjacent non-zero elements in a second column vector is greater than a first specified value, determining that the number of the tabs is 2, wherein the second column vector is composed of averages or sums of pixel values of respective rows of pixel points in the first direction in the third foreground segmentation image; or, under the condition that a difference between ordinates of adjacent non-zero elements in the second column vector is less than or equal to the first specified value, determining that the number of the tabs is 1.

14. The measurement method according to claim 2, wherein before the measuring the tab for size information according to the first target image and the second target image, the method further comprises:
measuring the electrode plate body for size information according to the first image; and/or
measuring the electrode plate body for size information according to the second image.

15. The measurement method according to claim 14, wherein the measuring the electrode plate body for size information according to the second image comprises:
performing foreground segmentation on the second image according to a second threshold to obtain a fourth foreground segmentation image; and
measuring the electrode plate body for size information according to pixel values of each column of pixel points in the second direction in the fourth foreground segmentation image.

16. The measurement method according to claim 15, wherein the measuring the electrode plate body for size information according to pixel values of each column of pixel points in the second direction in the fourth foreground segmentation image comprises:
obtaining a first row vector, where the first row vector is composed of sums or averages of pixel values of respective columns of pixel points in the second direction in the fourth foreground segmentation image;
setting elements with a value less than a second specified value in the first row vector to 0; and
determining size information about the electrode plate body according to non-zero elements in the first row vector.

17. The measurement method according to claim 15, wherein the method further comprises:
measuring a mark hole on the electrode plate for size information.

18. The measurement method according to claim 17, wherein the measuring a mark hole on the electrode plate for size information comprises:
performing foreground segmentation on the second image according to the second threshold and the fourth foreground segmentation image to obtain a fifth foreground segmentation image; and
determining size and coordinate of the mark hole in the first direction and in the second direction according to pixel values of each column of pixel points in the second direction and pixel values of each row of pixel points in the first direction in the fifth foreground segmentation image.

19. The measurement method according to claim 14, wherein the measuring the electrode plate body for size information according to the first image comprises:
performing foreground segmentation on the first image according to a third threshold to obtain a sixth foreground segmentation image; and
measuring the electrode plate body for size information according to pixel values of each column of pixel points in the second direction in the sixth foreground segmentation image.

20. The measurement method according to claim 19, wherein the measuring the electrode plate body for size information according to pixel values of each column of pixel points in the second direction in the sixth foreground segmentation image comprises:
obtaining a second row vector, wherein the second row vector is composed of sums or averages of pixel values of respective columns of pixel points in the second direction in the sixth foreground segmentation image;
setting elements with a value less than a second specified value in the second row vector to 0; and
determining size information about the electrode plate body according to the non-zero elements in the second row vector.

21. The measurement method according to claim 2, wherein the method further comprises:
performing foreground segmentation on the first image according to a first threshold to obtain a seventh foreground segmentation image;
determining a number of non-zero elements in a third column vector according to the seventh foreground segmentation image, wherein the third column vector is composed of averages or sums of pixel values of respective rows of pixel points in the first direction in the seventh foreground segmentation image; and
determining whether the electrode plate has a residual material defect, according to the number of non-zero elements in the third column vector.

22. The measurement method according to claim 21, wherein the determining whether the electrode plate has a residual material defect, according to the number of non-zero elements in the third column vector comprises:
under the condition that the number of non-zero elements in the third column vector is greater than the third specified value, determining that the electrode plate has a residual material defect.

23. The method according to claim 1, wherein the method further comprises:
determining a number of tabs in the first direction according to the coordinate of the mark hole on the electrode plate and the coordinate of the tab.

24. The measurement method according to claim 1, wherein before the measuring the target object for size information according to the first image and the second image, the method further comprises:
performing grayscale homogenization processing on the first image.

25. The measurement method according to claim 1, wherein before the acquiring a first image and a second image of a target object, the method further comprises:
acquiring a backlight image and a non-backlight image; and
compressing the backlight image and the non-backlight image according to a first compression ratio to obtain the first image and the second image.

26. The measurement method according to claim 25, wherein the method further comprises:
restoring actual size information about the target object from the measured size information about the target object to actual size information about the target object according to the first compression ratio.

* * * * *